US009991748B2

(12) United States Patent
Yamamoto et al.

(10) Patent No.: US 9,991,748 B2
(45) Date of Patent: Jun. 5, 2018

(54) WIRELESS POWER TRANSMISSION SYSTEM AND POWER TRANSMISSION DEVICE

(71) Applicant: Panasonic Corporation, Osaka (JP)

(72) Inventors: Hiroshi Yamamoto, Osaka (JP); Tsutomu Sakata, Osaka (JP); Hiroshi Kanno, Osaka (JP); Hiromu Matsumoto, Osaka (JP)

(73) Assignee: PANASONIC CORPORATION, Osaka (JP)

(*) Notice: Subject to any disclaimer, the term of this patent is extended or adjusted under 35 U.S.C. 154(b) by 142 days.

(21) Appl. No.: 14/935,502

(22) Filed: Nov. 9, 2015

(65) Prior Publication Data

US 2016/0064951 A1 Mar. 3, 2016

Related U.S. Application Data

(63) Continuation of application No. PCT/JP2014/003894, filed on Jul. 24, 2014.

(30) Foreign Application Priority Data

Jul. 31, 2013 (JP) .................. 2013-159150
Feb. 18, 2014 (JP) .................. 2014-028576

(51) Int. Cl.
*H02J 5/00* (2016.01)
*H02J 50/12* (2016.01)
(Continued)

(52) U.S. Cl.
CPC .............. *H02J 50/12* (2016.02); *H02J 5/005* (2013.01); *H02J 7/025* (2013.01); *H02J 17/00* (2013.01); *H02J 50/20* (2016.02); *H02J 50/80* (2016.02)

(58) Field of Classification Search
CPC .. H02J 5/005; H02J 50/20; H02J 50/80; H02J 17/00; H02J 50/12; H02J 7/025
See application file for complete search history.

(56) References Cited

U.S. PATENT DOCUMENTS

2004/0130916 A1 7/2004 Baarman
2008/0278264 A1 11/2008 Karalis et al.
(Continued)

FOREIGN PATENT DOCUMENTS

CN 101965671 A 2/2011
EP 2693599 2/2014
(Continued)

OTHER PUBLICATIONS

The Extended European Search Report from European Patent Office dated Jul. 14, 2016 for European Patent Application No. 14831749.8.
(Continued)

*Primary Examiner* — Jung Kim
(74) *Attorney, Agent, or Firm* — Greenblum & Bernstein, P.L.C.

(57) ABSTRACT

A power transmission device includes: an oscillator including first through fourth switching devices, and converting DC power into AC power by pulses supplied thereto; a power transmission antenna delivering the AC power to a load of a power receiving device; memory holding a predetermined value indicating at least one of required voltage, current, and power; a receiving circuit receiving information of at least one of voltage, current, and power, supplied to the load; and a control circuitry changing a phase difference Δθ between pulses supplied to the first and fourth switching devices, and between pulses supplied to the second and third switching devices, thereby changing voltage of the AC power, deciding frequency of AC power where efficiency is greatest, converging the at least one of voltage, current, and
(Continued)

power, of which information has been received, to the predetermined value range, and outputting AC power where the efficiency is the greatest.

6 Claims, 27 Drawing Sheets

(51) Int. Cl.
  *H02J 7/02* (2016.01)
  *H02J 17/00* (2006.01)
  *H02J 50/20* (2016.01)
  *H02J 50/80* (2016.01)

(56) References Cited

U.S. PATENT DOCUMENTS

2009/0174263 A1  7/2009  Baarman et al.
2010/0201313 A1  8/2010  Vorenkamp et al.
2010/0225173 A1  9/2010  Aoyama et al.
2011/0199045 A1  8/2011  Hui et al.
2014/0015340 A1  1/2014  Ito et al.

FOREIGN PATENT DOCUMENTS

| JP | 62-135270 | 6/1987 |
| JP | 10-174206 A | 6/1998 |
| JP | 2007-336717 | 12/2007 |
| JP | 2008-109762 | 5/2008 |
| JP | 2010-068657 | 3/2010 |
| JP | 2010-213414 | 9/2010 |
| JP | 2011-509067 | 3/2011 |
| JP | 2012-130173 | 7/2012 |
| WO | 2012/132412 | 10/2012 |

OTHER PUBLICATIONS

International Search Report of PCT application No. PCT/JP2014/003894 dated Sep. 2, 2014.
English Translation of Chinese Search Report dated Jun. 30, 2017 for the related Chinese Patent Application No. 201480039164.3.

NO PHASE SHIFT

FIG. 8

| LOAD IMPEDANCE | FREQUENCY | PHASE SHIFT VALUE | OUTPUT VOLTAGE |
|---|---|---|---|
| Z1 | f1 | Δθ11<br>Δθ12<br>... | V11<br>V12<br>... |
|  | f2 | Δθ21<br>Δθ22<br>... | V21<br>V22<br>... |
|  | ... | ... | ... |
| Z2 ... | f1 ... | ... | ... |

FIG. 9

| LOAD IMPEDANCE | FREQUENCY | TRANSMISSION EFFICIENCY |
|---|---|---|
| Z1 | f1<br>f2<br>f3<br>.<br>.<br>. | $\eta 11$<br>$\eta 12$<br>$\eta 13$<br>.<br>.<br>. |
| Z2 | f1<br>f2<br>f3<br>.<br>.<br>. | $\eta 21$<br>$\eta 22$<br>$\eta 23$<br>.<br>.<br>. |

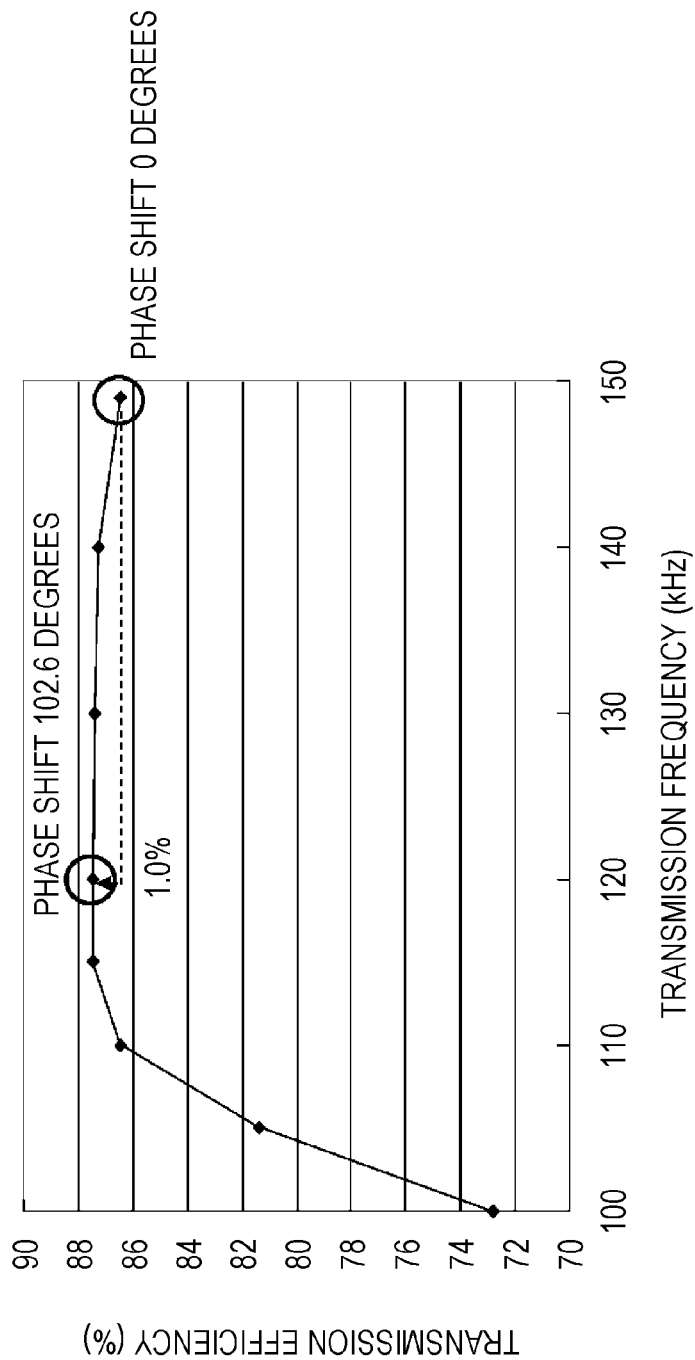

WIRELESS POWER TRANSMISSION SYSTEM AND POWER TRANSMISSION DEVICE

BACKGROUND

1. Technical Field

The present disclosure relates to a wireless power transmission system that transmits power wirelessly, and a power transmission device.

2. Description of the Related Art

As of recent, there has been proposed a technology which transmits electric power wirelessly (noncontact), using a new method called resonant magnetic coupling. For example, in the wireless power transmission system disclosed in U.S. Patent Application Publication No. 2008/0278264, two resonators are magnetically coupled by way of leakage (evanescent tail) of vibration energy generated in space in the perimeter of the resonators (antennas). Such wireless power transmission according to resonant magnetic coupling enables marked increase in the transmission distance, in comparison with conventional methods using electromagnetic inductance. It is said that good energy transmission can be performed in a case where an inter-resonator coupling coefficient k is larger than the root of the product of the attenuation constants Γ1 and Γ2 of the resonators. However, it has been demanded of this conventional art to be able to output a constant voltage to a load and also transmit power with high efficiency, even in cases where the load fluctuates or the environment in the perimeter of the antenna changes.

SUMMARY

In one general aspect, the techniques disclosed here feature a power transmission device including:

an oscillator including four switching devices, which are a first switching device and a third switching device connected to a high-potential side of DC power supplied from a DC source and a second switching device and a fourth switching device connected to a low-potential side of the DC power, a first output end of the oscillator connected to a side of the first switching device opposite to the high-potential side being connected to a side of the second switching device opposite to the low-potential side and a second output end of the oscillator connected to a side of the third switching device opposite to the high-potential side being connected to a side of the fourth switching device opposite to the low-potential side, the oscillator converting the DC power into AC power by pulses supplied to each of the first through fourth switching devices via the first and second output terminals, and output the AC power;

a power transmission antenna that transmits the AC power output from the oscillator for output to a load of a power receiving device;

memory that holds a predetermined value indicating at least one of required voltage, required current, and required power, for the power receiving device;

a receiving circuit that receives information of at least one of voltage, current, and power, supplied to the load of the power receiving device; and control circuitry operative to:

cause the oscillator to change a phase difference Δθ between pulses supplied to the first switching device and pulses supplied to the fourth switching device, and a phase difference Δθ between pulses supplied to the second switching device and pulses supplied to the third switching device, thereby changing voltage of the AC power output from the oscillator, determine a frequency of AC power where efficiency of the AC power is greatest, by changing a frequency of the voltage of the AC power output from the oscillator, and converge the at least one of voltage, current, and power, of which information has been received, to a range of the predetermined value, and outputs AC power where the efficiency is the greatest, to the load.

An aspect of the present disclosure provides a power transmission device capable of outputting a constant voltage to the load and also transmitting power with high efficiency, even in cases where the load fluctuates or the environment in the perimeter of the antenna changes.

It should be noted that general or specific embodiments thereof may be implemented as a system, a method, an integrated circuit, a computer program, or a storage medium, and may be implemented as any selective combination of a system, a device, a method, an integrated circuit, a computer program, and a storage medium.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 8 is a table illustrating change in output voltage, corresponding to load impedance, transmission frequency, and phase shift value, in the first embodiment;

FIG. 9 is a table illustrating transmission efficiency, corresponding to load impedance and transmission frequency in the first embodiment;

FIG. 11C is a diagram illustrating effects of voltage stabilization and improvement in transmission efficiency in a case where the load is 20 Ω in the first exemplary embodiment;

DETAILED DESCRIPTION

Underlying Knowledge Forming Basis of the Present Disclosure

The present inventors carried out the studies described below, with regard to the wireless power transmission system described in the Description of the Related Art. In a resonant magnetic coupling wireless power transmission system such as described in U.S. Patent Application Publication No. 2008/0278264, the input/output impedances of each of the circuit blocks on the transmission circuit are matched beforehand to maintain high transmission efficiency. However, in practice, the impedances of the two antennas change due to change in the environment in the perimeter of the antennas, i.e., change in the placement relationship between the power transmission and power receiving antennas. As a result, the arrangement disclosed in U.S. Patent Application Publication No. 2008/0278264 cannot follow the change in frequency where the transmission efficiency is optimal. Also, the arrangement disclosed in U.S. Patent Application Publication No. 2008/0278264 cannot follow the change in frequency where the transmission efficiency is optimal in a case where the impedance of the load has changed.

Japanese Unexamined Patent Application Publication No. 2010-68657 discloses a wireless power transmission system where a frequency sweep is performed at the time of performing power transmission to find optimal transmission efficiency, upon which an optimal frequency is determine-determined. However, the arrangement disclosed in Japanese Unexamined Patent Application Publication No. 2010-68657 performs adjustment of transmission efficiency solely by output power frequency control.

Also, change in impedance of a transmission system means that output voltage will change in a case where the input voltage to the wireless power transmission system is constant. Japanese Unexamined Patent Application Publication No. 62-135270 discloses a power system that performs frequency control where the frequency of the inverter is adjusted when the load is light, to handle such cases. Further, the arrangement disclosed in Japanese Unexamined Patent Application Publication No. 62-135270 adjusts the on-time ratio of inverter control pulses (hereinafter referred to as AC voltage output time ratio) during steady operation to stabilize the output voltage. However, the arrangement disclosed in Japanese Unexamined Patent Application Publication No. 62-135270 performs adjustment of output voltage solely by output power frequency control, or solely by controlling the AC voltage output time ratio.

As described above, neither Japanese Unexamined Patent Application Publication No. 2010-68657 nor Japanese Unexamined Patent Application Publication No. 62-135270 discloses adjusting both output voltage and transmission efficiency using both output power frequency control and AC voltage output time ratio control.

Figure 1A:
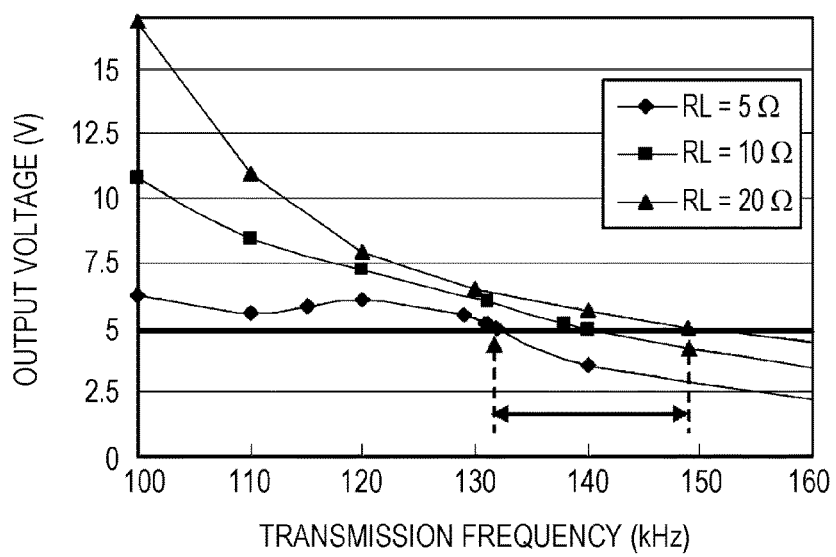
FIG. 1A is a graph illustrating an example of a relationship between transmission frequency and voltage supplied to a load (output voltage), in a wireless power transmission system according to a comparative example in an aspect of the present disclosure.

First, problems of a case where output voltage and transmission efficiency are adjusted solely by output power frequency control will be described below. FIG. 1A is a graph illustrating an example of a relationship between the frequency of AC power supplied from a power transmission device to a power receiving device (transmission frequency), and voltage supplied to a load (output voltage), in a wireless power transmission system according to a comparative example in an aspect of the present disclosure. This example has been analyzed using a circuit simulator. The configuration of the wireless power transmission system is the same as that in FIG. 2A, which will be described later. A control circuitry that controls AC power supplied from the power transmission device to the power receiving device solely uses frequency control, in the same way as in Japanese Unexamined Patent Application Publication No. 2010-68657 and Japanese Unexamined Patent Application Publication No. 62-135270. The configuration of the power transmission antenna and power receiving antenna is the same as in FIG. 6, which will be described later.

The specifications of the power transmission antenna were, for example, inductance value of 40 mF, resistance value as to frequency f0 of 1.86 f0-mΩ, and resonance capacitor capacity of 73 pF, and the specifications of the power receiving antenna were inductance value of 25.84 mF, resistance value as to frequency f0 of 2.22 f0-mΩ, and resonance capacitor capacity of 750 pF. Examples of cases are illustrated where the load impedances RL were 5 Ω, 10 Ω, and 20 Ω, in an arrangement where DC voltage Vdc of a DC source 1030 is 12 V, target voltage of a power receiving device 1020 is 5 V, and a frequency sweep range is 110 kHz to 140 kHz.

The output voltage changes dependent on the impedance of the load and the transmission frequency, which can be seen in this graph. Accordingly, in a case where the impedance of the load changes, it is suitable to change the transmission frequency to stabilize the output voltage. For example, in a case where the impedance of the load changes in a range of 5 Ω to 20 Ω in the example illustrated in FIG. 1A, it is suitable to change the transmission frequency in a range of 130 kHz to 150 kHz, to maintain the output voltage at 5 V.

Figure 1B:
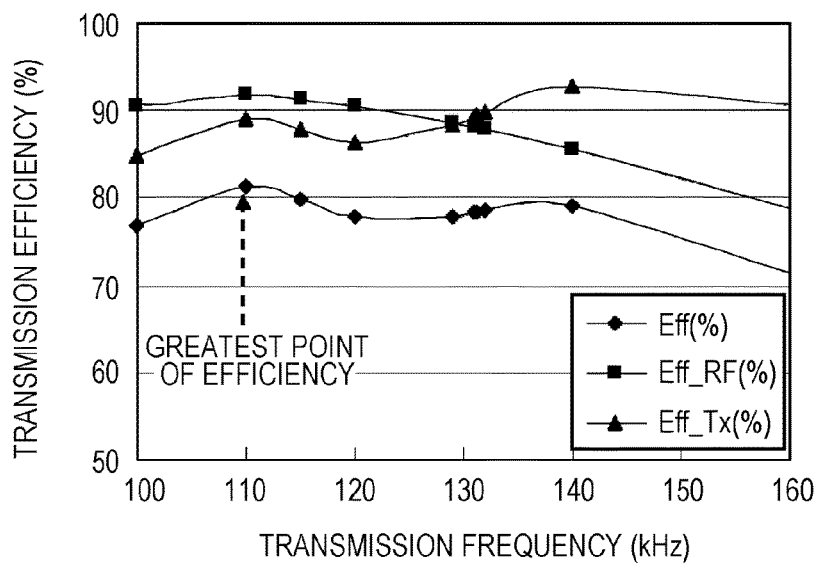
FIG. 1B is a graph illustrating an example of a relationship between transmission frequency and transmission efficiency, in a wireless power transmission system according to a comparative example in an aspect of the present disclosure.

However, in a case of changing the transmission frequency to maintain the output voltage constant as in Japanese Unexamined Patent Application Publication No. 2010-68657 and Japanese Unexamined Patent Application Publication No. 62-135270, the transmission efficiency is not necessarily optimized. FIG. 1B is a graph illustrating an example of a relationship between transmission frequency and transmission efficiency. In detail, FIG. 1B illustrates transmission efficiency Eff_Tx at the power transmission device, transmission efficiency Eff_RF at the power transmission/receiving antennas, and overall transmission efficiency Eff, in a case where RL=5 Ω in FIG. 1A. It can be seen from this graph that the transmission efficiency is greatest when the transmission frequency is approximately 110 kHz, so the transmission efficiency is not greatest in the range of 130 kHz to 150 kHz.

Thus, according to Japanese Unexamined Patent Application Publication No. 2010-68657 and Japanese Unexamined Patent Application Publication No. 62-135270, the frequency range of 130 kHz to 150 kHz is good for the target voltage of 5 V, so the transmission frequency is determinedetermined in this range. However, the transmission efficiency is actually lower than greatest in this transmission frequency of 130 kHz to 150 kHz. The transmission efficiency is greatest when the transmission frequency is approximately 110 kHz. It can thus be seen that realizing both output of constant voltage to the load and transmission at a frequency with high transmission efficiency by frequency control alone is difficult.

Next, in a case of adjusting output voltage and transmission efficiency solely by AC voltage output time ratio, output voltage can be adjusted solely by adjusting the AC voltage output time ratio, but realizing both output of constant voltage to the load and transmission at a frequency with high transmission efficiency is difficult. In a state where the output voltage is constant, adjusting the AC voltage output time ratio cannot handle frequencies where the transmission efficiency is optimal after change in the positional relationship between the power transmission and power receiving antennas, since the frequency of the output power is constant as well.

The present inventors found the above problem as the result of diligent study. The above problem is thought to be due to the following reason. That is to say, the wireless power transmission system wirelessly transmits vibration energy by a resonant frequency, by magnetic resonance coupling of two resonators (the power transmission antenna and power receiving antenna). Near the resonant frequency where the power transmission antenna and power receiving antenna are resonating, the power loss for power transmission/receiving is minimal. Accordingly, the transmission efficiency is greatest near the resonant frequency of the two resonators (approximately 110 kHz). On the other hand, various voltages are required for the load depending on the device (power receiving device). Accordingly, the output voltage near the resonant frequency where the transmission efficiency is the greatest (approximately 110 kHz) is not necessarily the voltage required by the power receiving device. For example, one frequency is found where the transmission efficiency is greatest regarding a certain load, 10 Ω for example. The determinedetermined transmission frequency in this case is approximately 110 kHz. One output voltage of the load corresponding to this transmission frequency (approximately 110 kHz) is also found, and it can be seen in FIG. 1A that this is 8 V.

However, the required voltages for charging devices (power receiving devices) that can be charged by noncontact, such as smartphones, tablet terminals, cellular phones, electric vehicles, and so forth, are varied. For example, in a case that a smartphone requires 5 V, the above-described 8 V is a higher voltage than the required voltage. As a result, this exceeds the required voltage (5 V) of the smartphone, and applying the power of the 8 V voltage to the smartphone may damage the circuits of the smartphone.

Accordingly, it can be thought that the above-described problem occurs due to mismatching between the transmission frequency where the efficiency is greatest near the resonant frequency of the power transmission and power receiving antennas, and the transmission frequencies for the voltage that the power receiving devices require. Further, even if the transmission frequency where the efficiency is greatest and the transmission frequency for the voltage that a power receiving device requires did match, the resonant frequency of the power transmission antenna and power receiving antenna changes if the environment in the perimeter of the antenna changes, for example, if the distance between the power transmission and power receiving antennas changes, for example, so the transmission frequency where the transmission efficiency is greatest changes.

In this case, the transmission efficiency is greatest near the resonance frequency after change at the power transmission antenna and power receiving antenna. Accordingly, deviation occurs between the transmission frequency where the transmission efficiency is greatest and the transmission frequency for the voltage that the power receiving device requires. Also, in a case where the load is what changes, the resonant frequency of the power transmission antenna and power receiving antenna changes in the same way as the case where the environment in the perimeter of the antennas changes, so the transmission frequency where the transmission efficiency is greatest changes. Accordingly, deviation occurs between the transmission frequency where the transmission efficiency is greatest and the transmission frequency for the voltage that the power receiving device requires. In either of these cases, power cannot be transmitted at maximum transmission efficiency if the transmission frequency is set to match the target voltage of the power receiving device, but on the other hand the target voltage cannot be achieved if the transmission frequency is set to maximum transmission efficiency, which is the same as the above-described case.

This problem can also be thought to occur due to mismatching between the transmission frequency where the transmission efficiency is greatest near the resonant frequency of the power transmission antenna and power receiving antenna, and the transmission frequencies for the voltage that the power receiving devices require.

Accordingly, there is demand for a power transmission device in a wireless power transmission system which can output a constant voltage to a load and also transmit power at high efficiency, even in cases where the load changes and the environment in the periphery of the antennas changes. There also is demand for transmit electric power with high efficiency while satisfying required voltage of various power receiving devices. The present inventors have reached the following aspects of the invention in light of the above.

One aspect of a power transmission device according to the present disclosure includes:
  an oscillator that has a first switching device connected to a high-voltage side of DC power supplied from a DC source and a second switching device connected to a low-voltage side of the DC power, the oscillator outputting AC power converted from the DC power via a first output end connected to the first switching device and a second output end connected to the second switching device;
  a power transmission antenna that transmits the AC power output from the oscillator, for output to a load of a power receiving device;
  memory that holds a predetermined value indicating at least one of required voltage, required current, and required power, of the power receiving device;
  a receiving circuit that receives information of at least one of voltage, current, and power supplied to the load of the power receiving device; and
  control circuitry operative to:
    change an output time ratio of voltage of the AC power output from the oscillator, by using the first switching device and the second switching device to change times at which voltage at the first output end of the oscillator and voltage at the second output end are to be of the same potential,
    change a frequency of voltage of the AC power output from the oscillator and determine determines a frequency of AC power where efficiency of the AC power is greatest, and
    converge at least one of the voltage, current, and power, of which information has been received, to a range of the stipulated value, and outputs AC power of which the efficiency is greatest to the load.

In a conventional power transmission device, even if at least one of the voltage, current, and power, of which information has been received, is made to converge in a range of a stipulated value representing at least one of required voltage, required current, and required power, of the power receiving device, AC power with greatest efficiency is not realized. On the other hand, even if the power transmission device outputs AC power with greatest efficiency to the power receiving device, at least one of the values of the voltage, current, and power, of which information the power transmission device has received from the power receiving device, will fall outside of a range of a stipulated value representing at least one of required voltage, required current, and required power of the power receiving device.

According to this aspect, the output time ratio of voltage of the AC power output from the power transmission device oscillator is changed, so that at least one of the values of the voltage, current, and power, of which information the power transmission device has received from the power receiving device, is made to converge in a range of a stipulated value, while deciding a frequency for AC power where efficiency is greatest.

Accordingly, even in a case where the frequency of the AC power output from the power transmission device where the efficiency is greatest, and the frequency of voltage of the AC power required by the power receiving device do not match, at least one of the values of the voltage, current, and power, of which information the power transmission device has received from the power receiving device, is made to converge in a range of a stipulated value, so the efficiency of the AC power received at the power receiving device can be maximized.

More specific embodiments of the present disclosure will be described below with reference to the attached drawings. In the following description, components which are the same or equivalent are denoted by the same reference numerals.

First Embodiment

Figure 2A:
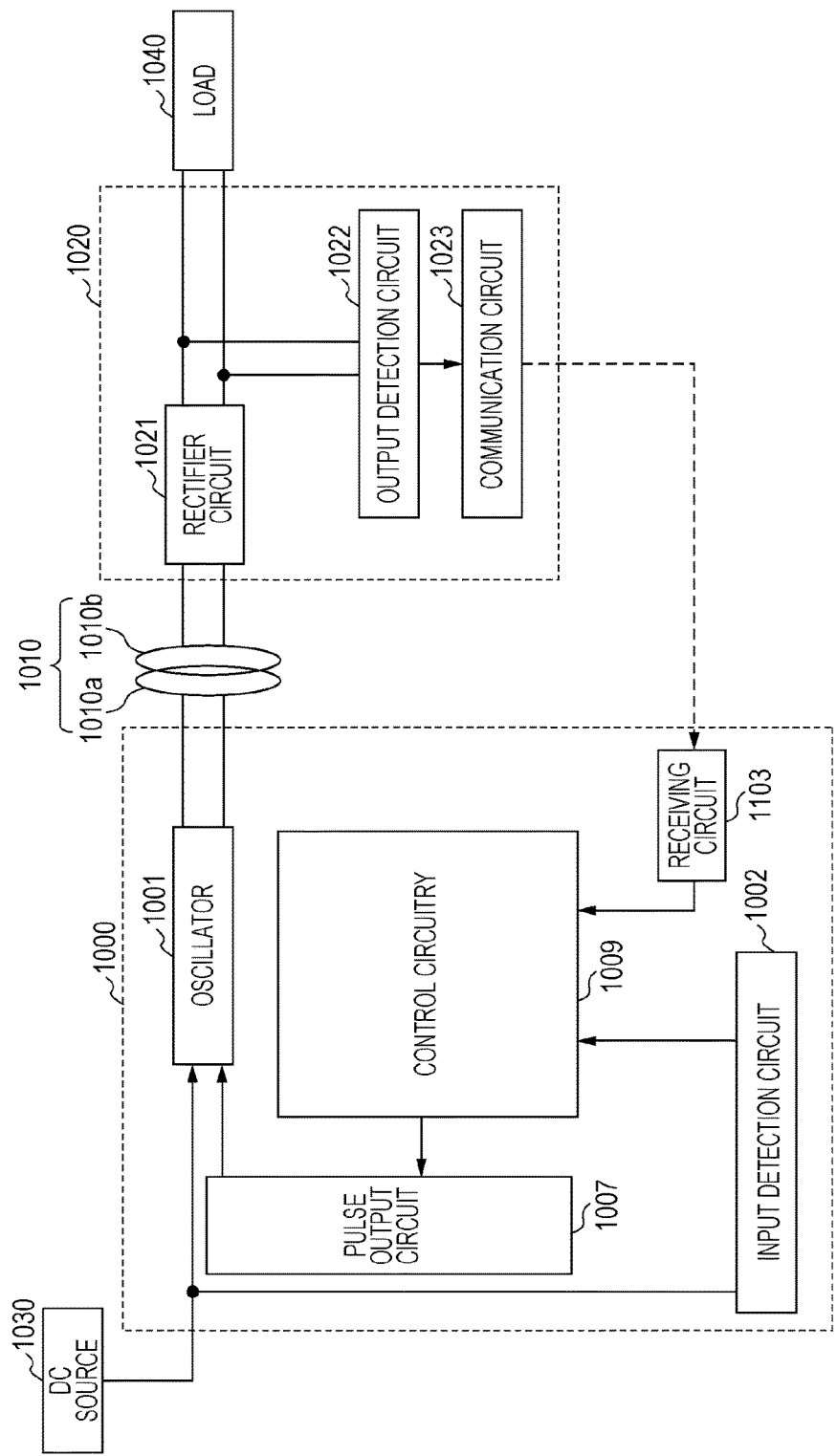
FIG. 2A is a diagram illustrating a hardware configuration of a wireless power transmission system according to a first embodiment.

FIG. 2A is a block diagram illustrating a hardware configuration of a wireless power transmission system according to a first embodiment of the present disclosure. The wireless power transmission system according to the present embodiment includes a power transmission device 1000 that converts direct current (DC) energy input from a DC source 1030 into AC energy and outputs, a transmission/receiving antenna 1010 that wirelessly transmits the AC energy output from the power transmission device 1000, and a power receiving device 1020 that converts AC energy transmitted by the transmission/receiving antenna 1010 into DC energy and supplies to a load 1040. The transmission/receiving antenna 1010 is made up of a pair of a power transmission antenna 1010a and a power receiving antenna 1010b, each antenna consisting of a resonance circuit including a coil and a capacitor. The transmission/receiving antenna 1010 wirelessly transmits the AC energy output from the power transmission device 1000 to the power receiving device 1020 by resonant magnetic coupling. The transmitted AC energy is converted into DC energy by a rectifier circuit 1021 within the power receiving device 1020, and supplied to the load 1040.

The power transmission device 1000 and the power transmission antenna 1010*a* may be disposed in the power transmission device, and the power receiving antenna 1010*b*, power receiving device 1020, and load 1040 in the power receiving device. The power receiving device may be an electronic device such as a smartphone, tablet terminal mobile terminal, or the like, or an electric machine such as an electric vehicle, or the like, for example. The power transmission device may be a charger which wirelessly supplies power to the power receiving device. The load 1040 is a secondary battery for example, and may be charged by DC energy output from the power receiving device 1020.

The power receiving device 1020 includes the rectifier circuit 1021 that converts the AC energy transmitted from the power receiving antenna 1010*b* into DC energy and outputs to the load 1040, an output detection circuit 1022 that detects voltage and current to be output to the load 1040, and a communication circuit 1023 that transmits detection results by the output detection circuit 1022 to the power transmission device 1000.

The power transmission device 1000 includes an input detection circuit 1002 that detects DC voltage and current input from the DC source 1030, an oscillator 1001 that converts the input DC energy into AC energy using multiple switching devices, a pulse output circuit 1007 that sends pulses to the multiple switching devices included in the oscillator 1001, control circuitry 1009 that gives pulse generation instructions to the pulse output circuit 1007, and a receiving circuit 1103 that receives signals from the communication circuit 1023. The oscillator 1001 has multiple switching devices that change the state of conduction in accordance with input pulses, and can convert input DC energy into AC energy by changing the state of conduction of the switching devices. The receiving circuit 1103 receives the detection results of the output detection circuit 1022 transmitted from the communication circuit 1023, and the detection results of the input detection circuit 1002, and outputs to the control circuitry 1009. The control circuitry 1009 determine determines the frequency and output time ratio of the voltage output from the oscillator 1001, based on the detection results of the output detection circuit 1022 that have been transmitted, and the detection results of the input detection circuit 1002. The term "output time ratio" of voltage here means the percentage of time out of one cycle where voltage larger than a predetermined value (e.g., around several % to 20% of the maximum amplitude) is being output. During time other than this time, the voltages at both ends of the power transmission antenna 1010*a* are fixed to the same potential. The output time ratio, and fixing the voltages at both ends of the power transmission antenna 1010*a* to the same potential, can be controlled by adjusting at least one of the duty cycle and phase of the pulses input to the switching devices. An example of control will be described in the present embodiment where the output time ratio is adjusted by adjusting the pulse phase, and the voltages at both ends of the power transmission antenna 1010*a* are fixed to the same potential. The control circuitry 1009 controls the pulse output circuit 1007 so that the frequency and output time ratio of the voltage output from the oscillator 1001 can each be the determined determined frequency and output time ratio. More specifically, the control circuitry 1009 controls the pulse output circuit 1007 so as to output pulses corresponding to the determined determined frequency and output time ratio to the switching devices.

According to this configuration, the wireless power transmission system according to the present embodiment can change output properties at the power transmission device 1000 and stabilize the voltage supplied to the load 1040, while also bringing the transmission efficiency near to the maximum. Accordingly, in a case where the load 1040 is a secondary battery for example, highly efficient charging can be maintained even if the impedance changes according to the amount of charging, or the position of the power receiving antenna 1010*b* is deviated and the impedance of the overall system changes.

Although FIG. 2A illustrates the power transmission antenna and the power receiving antenna as having the same size, the present disclosure is not restricted to such an example. The power transmission antenna may be smaller than the power receiving antenna, or the opposite may be true. Also, the transmission/receiving antenna 1010 may include multiple of either or both of the power transmission antenna and power receiving antenna. The wireless power transmission system may include components other than those illustrated.

Figure 2B:
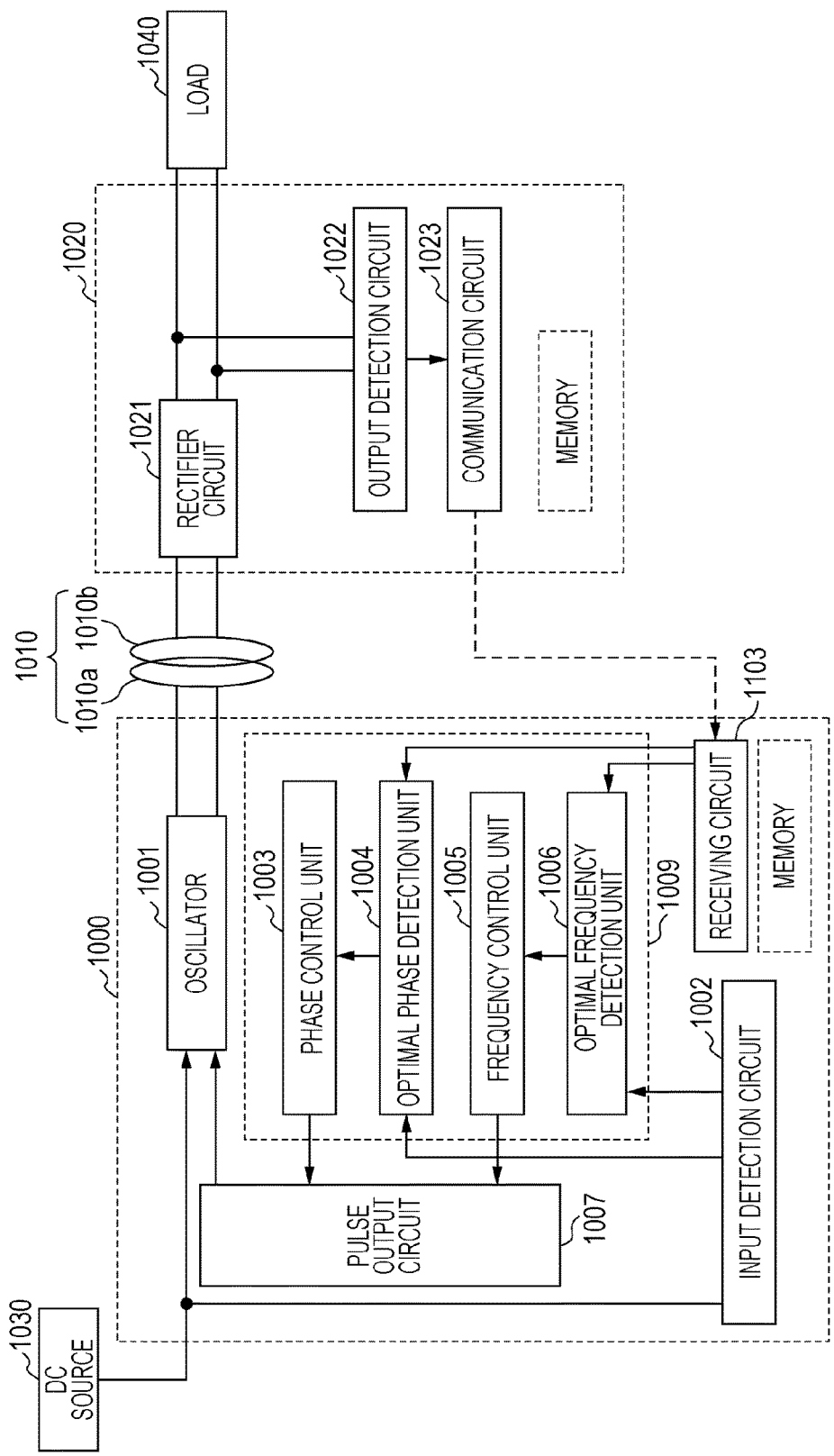
FIG. 2B is a diagram illustrating a schematic configuration of the wireless power transmission system according to the first embodiment.

The components will be described in further detail below. FIG. 2B is a block diagram illustrating the functional configuration that the control circuitry 1009 in FIG. 2A has. Components which are in common with FIG. 2A are denoted by the same reference numerals. FIG. 2B illustrates four functional blocks realized by the control circuitry 1009. Specifically, these are a phase control unit 1003, an optimal phase detection unit 1004, a frequency control unit 1005, and an optimal frequency detection unit 1006. The control circuitry 1009 may be realized by a combination of a Central Processing Unit (CPU) and a computer program stored in memory, for example. The functions of the functional blocks in FIG. 2B are realized by the CPU executing a command set described in the computer program. Alternatively, the same functions may be realized by hardware such as a Digital Signal Processor (DSP) or the like where a computer program has been installed in one semiconductor circuit.

The optimal phase detection unit 1004 determines an optimal pulse phase for stabilizing the voltage output to the load 1040, based on the detection results of the output detection circuit 1022 transmitted from the communication circuit 1023, and the detection results of the input detection circuit 1002. The phase control unit 1003 notifies the pulse output circuit 1007 of the pulse phase determined by the optimal phase detection unit 1004. On the other hand, the optimal pulse frequency detection unit 1006 determines an optimal frequency for maximizing the transmission efficiency, based on the detection results of the output detection circuit 1022 conveyed from the communication circuit 1023 and the detection results of the input detection circuit 1002. The frequency control unit 1005 notifies the pulse output circuit 1007 of the frequency determined by the optimal frequency detection unit 1006. The determined frequency has been determined by searching for a frequency where the transmission efficiency is the greatest in a predetermined frequency width, so in strict terms there are cases included where this frequency is not the frequency where the transmission efficiency is the greatest. This is but a frequency where the transmission efficiency is near maximum (including the maximal point). The frequency where the transmission efficiency is greatest may be a frequency where the value of transmission efficiency is at or above a threshold value set beforehand. In the above first embodiment, the communication circuit 1023 transmits the detection results of the output detection circuit 1022 to the optimal phase detection unit 1004 and the optimal frequency detection unit 1006.

Now, communication between the power receiving device 1020 and the power transmission device 1000 will be described. The receiving circuit 1103 is provided at any one location in the power transmission device as illustrated in FIGS. 2A and 2B, and the receiving circuit receives the detection results of the output detection circuit 1022 from the communication circuit 1023. The receiving circuit may also transmit the detection results to the optimal phase detection unit 1004 and the optimal frequency detection unit 1006. Alternatively, the optimal phase detection unit 1004 and optimal frequency detection unit 1006 may have a receiving circuit and directly receive the detection results.

Figure 15:
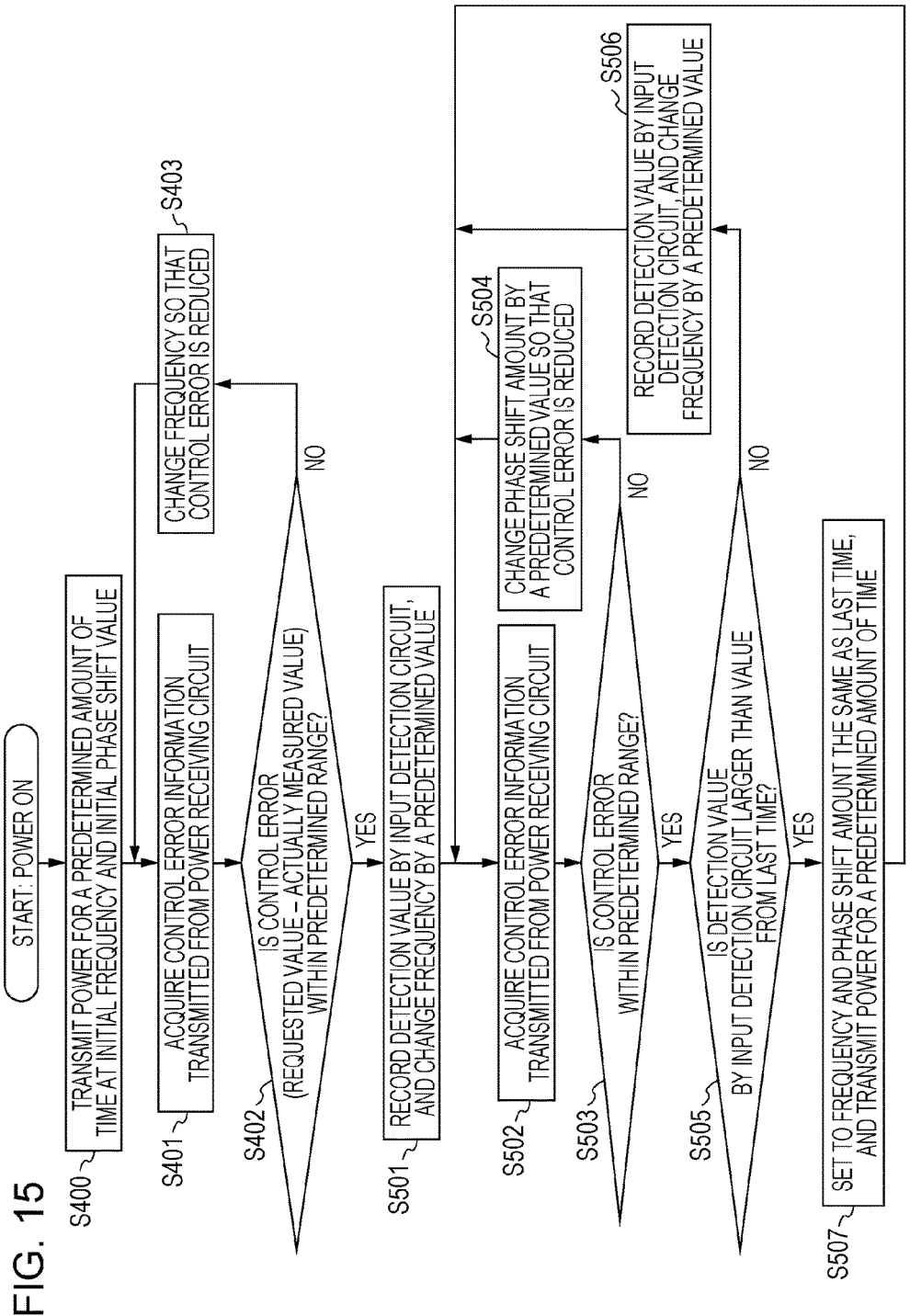
FIG. 15 is a flowchart illustrating processing according to a third example of a control method in the second embodiment.

The information that the power receiving device 1020 receives may be the requirement values of required voltage, required current, or required power, of the power receiving device described in FIG. 15, predetermined values thereof, and further ranges of predetermined values. Next, examples of requirement values, predetermined values of requirement values, and ranges of predetermined values will be described. For example, in a case of a smartphone, the target voltage for the load is 5 V. The predetermined value for the required voltage that is permissible here is, for example, ±0.04 V, or −0.04 V to +0.04 V. Further, the range of predetermined value for voltage is, for example, 5 V±0.04 V, or 4.96 V to 5.04 V.

The information that the power receiving device 1020 receives may also be actual measurement values of voltage, current, or power, being supplied to the load. Also, the information that the power receiving device 1020 receives may be error information (requirement value−actual measurement value) of voltage, current, or power, of the AC power, being output to the load, described in FIG. 15. Information which the receiving circuit receives may be stored in memory disposed at any one position in the power transmission device, and extracted and used, as illustrated in FIG. 2B. At least one information which the receiving circuit receives may be stored in memory of the power transmission device beforehand, with this information being extracted and used by some sort of signal from the power receiving device. Also, information which the power receiving device transmits may be stored in memory disposed at any one position in the power receiving device. The pulse output circuit 1007 is, for example, a known gate driver, and generates pulses for input to the switching devices of the oscillator 1001, based on information of phase and frequency input from the phase control unit 1003 and the frequency control unit 1005.

Figure 3:
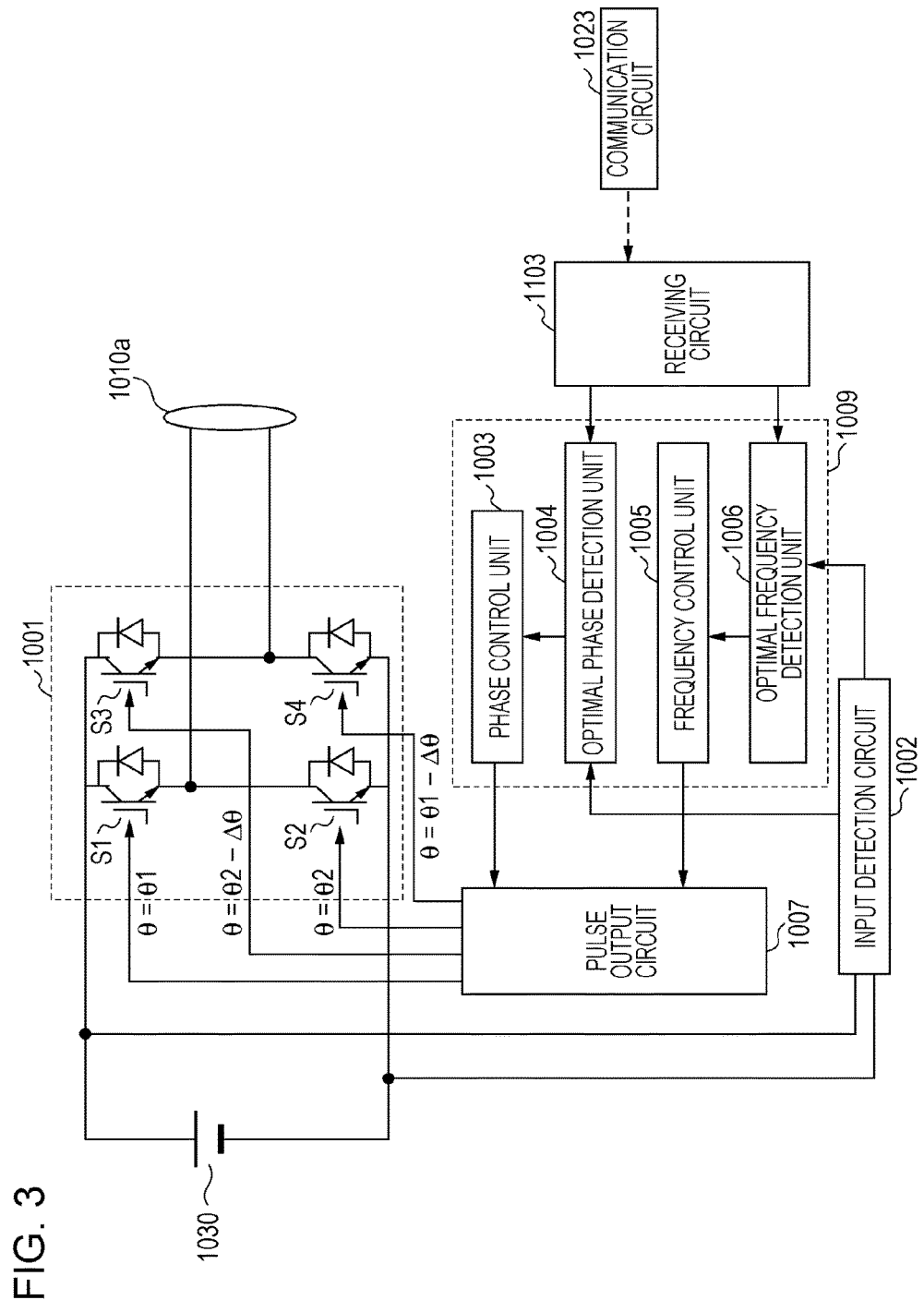
FIG. 3 is a block diagram illustrating an oscillation unit in the first embodiment.

FIG. 3 is a block diagram illustrating the configuration of the oscillator 1001 according to the present embodiment. the oscillator 1001 includes four switching devices (S1 through S4). The switching devices may be realized by field-effect transistors such as metal oxide semiconductor field effect transistors (MOSFET), for example.

One end of the switching devices S1 and S3 is connected by wiring to the side of the DC source 1030 where the voltage is high, and one end of the switching devices S2 and S4 is connected by wiring to the side of the DC source 1030 where the voltage is low. Note that an LC filter (also known as an inductor filter) or a CLC filter (Also known as a capacitor input Pi filter) may be inserted between the DC source 1030 and the switching devices as an input filter. Also, the meaning of the aforementioned one end is the input terminal of the switching devices.

The oscillator 1001 and the power transmission antenna 1010a are connected by wiring extending from between the switching devices S1 and S2, and from between the switching devices S3 and S4. The switching devices can each be placed in a conducting state by the pulse output circuit 1007 inputting pulses (applying voltage) to the gates of the switching devices. In the present specification, a state where voltage is applied to the gates of the switching devices and current flows is called "on", and a state where voltage is not applied and current does not flow is called "off".

The four switching devices S1 through S4 are made up of a switching device pair (S1 and S4) that outputs voltage of the same polarity as the input voltage from the DC source 1030 when conducting, and a switching device pair (S2 and S3) that outputs voltage of the opposite polarity from the input voltage when conducting. The input DC voltage can be converted into AC voltage of a frequency f0 by alternately repeating a state where the switching devices S1 and S4 are on and a state where the switching devices S2 and S3 are off at the frequency f0.

While transmitting power, the control circuitry 1009 according to the present embodiment controls the frequency of pulses input to the switching devices, and phase different $\Delta\theta$ between two pulses each input to the two switching devices making up the switching device pairs (also called "phase shift value"). That is to say, with the phases of pulses input to the switching devices S1 and S2 at a certain point-in-time written as $\theta 1$ and $\theta 2$, the phases of the pulses input to the switching devices S3 and S4 can be expressed as $\theta 2-\Delta\theta$ and $\theta 1-\Delta\theta$, respectively. The optimal phase detection unit 1004 and the phase control unit 1003 change the phase difference $\Delta\theta$ to an optimal value according to the detection results of the input detection circuit 1002 and output detection circuit 1022. Now, the pulse at the switching device S2 is typically an inverted pulse as to the pulse at the switching device S1, and the phase of the pulse at the switching device S2 is set to a phase shifted half-cycle as to the phase of the pulse at the switching device S1, i.e., is set to $\theta 2=\theta 1+180°$.

Figure 4A:
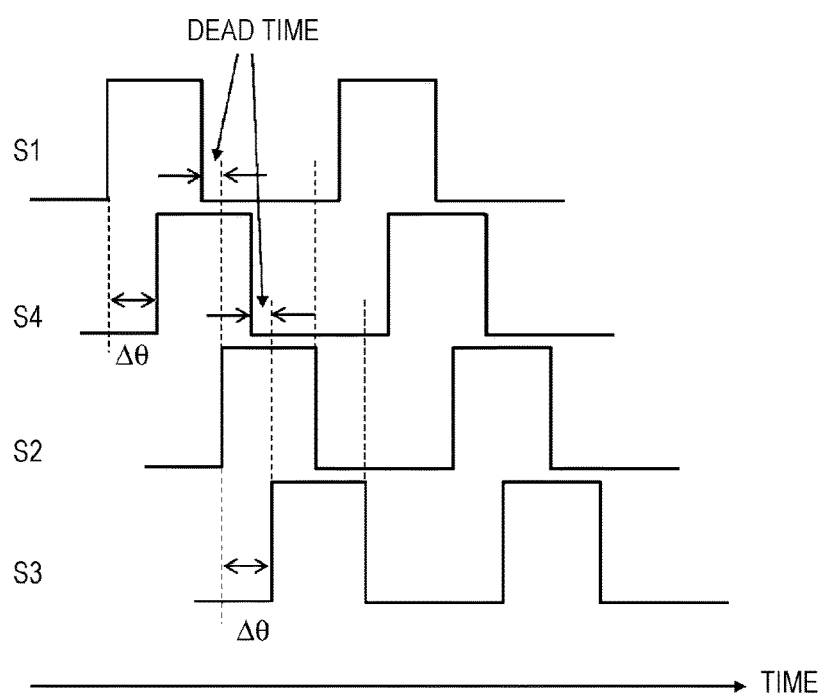
FIG. 4A is a diagram schematically illustrating timings of pulses input to each of four switching devices, in a case of changing phases in the first embodiment.

FIG. 4A is a diagram schematically illustrating timings of pulses input to each of the switching devices S1 through S4. The pulse output circuit 1007 outputs an inverted pulse to the switching device S2 as to the output pulse to the switching device S1, with a certain amount of time where both are off (called "dead time"). In the same way, the pulse output circuit 1007 outputs an inverted pulse to the switching device S4 as to the output pulse to the switching device S3, with a certain amount of time where both are off. Further, in a case where the phase shift value $\Delta\theta$ is 0, the pulse output circuit 1007 outputs the pulses so that the switching device S1 and the switching device S4 are on at the same time, and the switching device S2 and the switching device S3 are on at the same time. The reason that the dead time is provided between the two pulses input to the switching device S1 and switching device S2, and between the two pulses input to the switching device S3 and switching device S4, is to prevent the switching device S1 and switching device S2, or switching device S3 and switching device S4, from going on at the same time at the instant of the leading edge and trailing edge of the pulses, generating a load short and damaging the switching devices. Accordingly, the duty cycle of the pulses is set to a value smaller than 50% in the example illustrated in FIG. 4A.

Figure 5A:
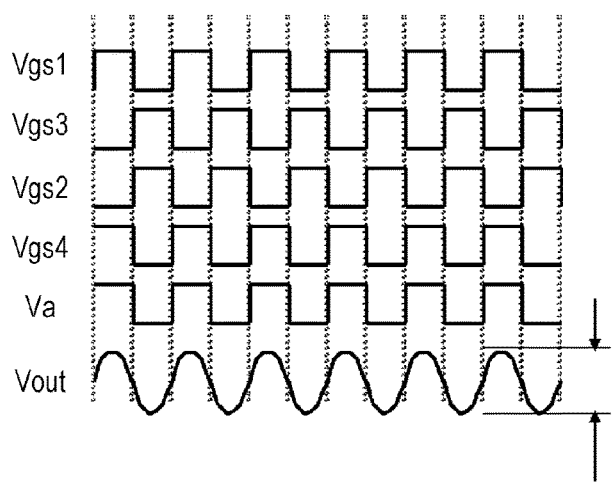
FIG. 5A is a diagram illustrating an example of waveforms of pulse voltages and output voltage in a case where there is no phase shift in the first embodiment.
Figure 5B:
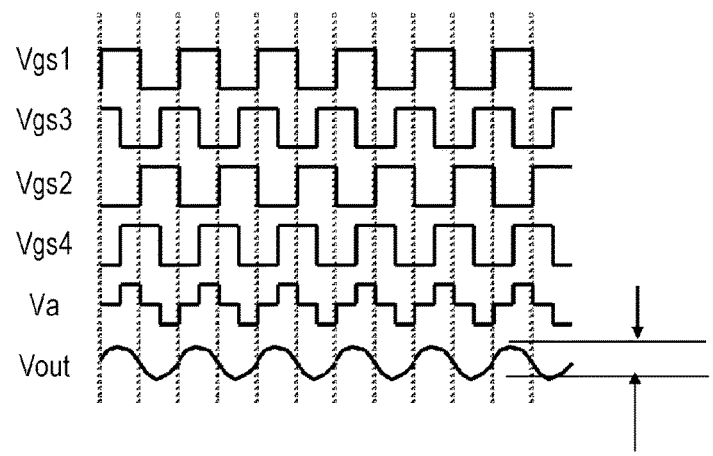
FIG. 5B is a diagram illustrating an example of waveforms of pulse voltages and output voltage in a case where there is phase shift of 90 degrees in the first embodiment.

FIG. 5A is a diagram illustrating an example of waveforms of pulse voltages Vgs1 through Vgs4 applied to the respective switching devices S1 through S4 in a case where there is no phase shift (Δθ=0), voltage Va output from the oscillator 1001, and voltage Vou where the voltage Va has been converted to sine waves. FIG. 5B is a diagram illustrating an example of these waveforms of voltage in a case where the phase is shifted by 90 degrees (Δθ=90°). As can be seen from these drawings, the output time ratio of output from the oscillator 1001 is reduced by setting the phase shift value Δθ to be larger than 0, and accordingly the amplitude of the output AC voltage can be reduced.

At this time, in the period of the phase shift value Δθ, the state is that the switching devices S1 and S3 are on at the same time, or the switching devices S2 and S4 are on at the same time. Consequently, in a case where the switching devices S1 and S3 are on at the same time, the voltage at both ends of the power transmission antenna 1010a is fixed to the higher voltage of the DC source 1030, and in a case where the switching devices S2 and S4 are on at the same time, the voltage at both ends of the power transmission antenna 1010a is fixed to the lower voltage of the DC source 1030.

Accordingly, the voltage at both ends of the power transmission antenna 1010a does not become unstable as compared to a case where the output time ratio is reduced by turning all switching devices off, so occurrence of return current can be suppressed.

Figure 4B:
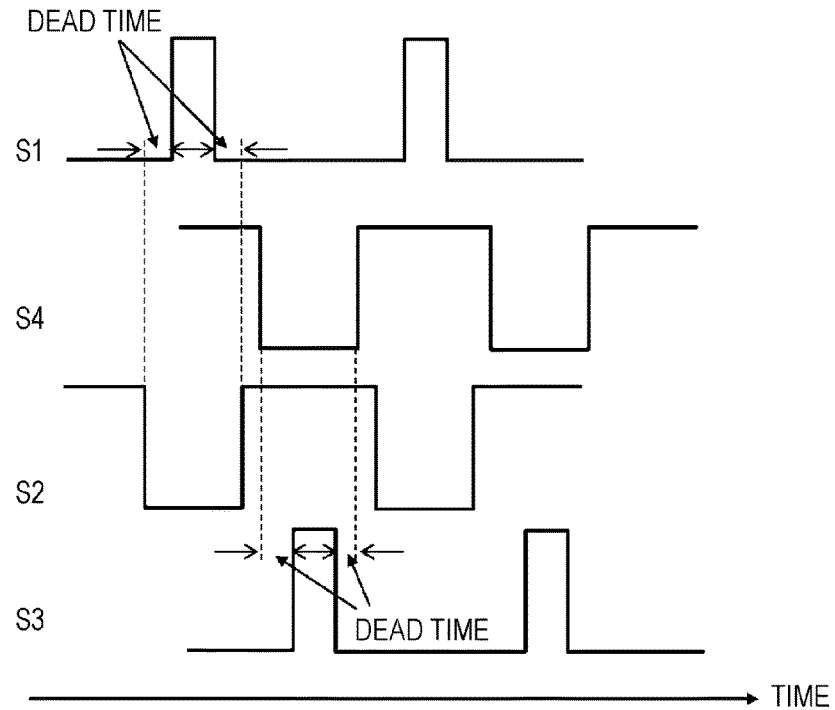
FIG. 4B is a diagram schematic illustrating timings of pulses input to each of four switching devices, in a case of changing duty cycles in the first embodiment.

Although description has been made regarding an arrangement where shift is provided to the phase of the control pulses to the switching devices S1 and S4, and the switching devices S2 and S3, this may be realized by an arrangement where control pulses are provided so that the duty cycle is the same for the pair of the switching devices S1 and S3, and the pair of switching devices S2 and S4, and also dead time is added so that the phases of the pair of the switching devices S1 and S2 and the pair of switching devices S3 and S4 are inverted as to each other, thereby providing a time during which the voltages at both ends of the power transmission antenna 1010a are fixed to the lower voltage of the DC source 1030, as illustrated in FIG. 4B. Also, while description has been made in FIG. 4B regarding an example where the duty cycle of the pair of switching devices S1 and S3 is smaller than the duty cycle of the pair of switching devices S2 and S4, and arrangement may be made where this is larger instead of smaller, thereby providing a time during which the voltages at both ends of the power transmission antenna 1010a are fixed to the higher voltage of the DC source 1030.

Next, a configuration example of the power transmission antenna 1010a and the power receiving antenna 1010b will be described. The power transmission antenna 1010a and power receiving antenna 1010b can perform noncontact transmission of high-frequency power of a frequency f0 by resonant magnetic coupling. The power receiving antenna 1010b is not in contact with the power transmission antenna 1010a, but rather separated from the power transmission antenna 1010a by a distance of around several millimeters to several tens of centimeters, for example. The frequency (transmission frequency) f0 of the high-frequency power to be transmitted may be set to a range of 50 kHz to 300 GHz. The transmission frequency may be set within a range of 20 kHz to 10 GHz, may be set within a range of 20 kHz to 20 MHz, or may be set within a range of 20 kHz to 1 MHz.

The term "antenna" in the wireless power transmission system according to the present embodiment is not a normal antenna for transmit/receiving radiated electromagnetic fields, but rather is a component which transmits energy between two objects, using coupling of neighboring components (evanescent tails) of electromagnetic fields of resonators. Energy loss (radiation loss) that occurs when propagating electromagnetic waves over distances does not occur with wireless power transmission using resonant electromagnetic fields, so power can be transmitted at extremely high efficiency. Energy transmission using such resonant electromagnetic fields (near-field) coupling not only has less loss as compared to known wireless power transmission using Faraday's law of electromagnetic induction, but also enables highly efficient transmission of energy between two resonators (antennas) that are situated several meters, for example, away from each other.

In order to perform wireless power transmission based on such a principle, coupling is desirably caused between the two resonance antennas. Accordingly, the resonant frequencies of the power transmission antenna 1010a and power receiving antenna 1010b are set to substantially the same frequency at transmission frequency f0. Note, however, that these resonant frequencies do not have to completely match the transmission frequency.

Generally, in a case where two resonators having characteristic resonance frequencies are electrically coupled, the resonance frequencies are known to change. Even if the resonance frequencies of the two resonators are the same, the coupling causes the resonance frequency of the resonator pair to separate into two frequencies. Of the two resonance frequencies exhibited by the coupled resonator pair, the one with a higher frequency is called even-mode resonance frequency (fH), and the one with a lower frequency is called odd-mode resonance frequency (fL). Now, a coupling coefficient k between the resonators is expressed as in the following Expression 1.

$$k=(fH2-fL2)/(fH2+fL2) \quad \text{(Expression 1)}$$

The stronger the coupling is, the larger a value k becomes, and the amount of separation of the two resonance frequencies increases. The value of k is set to a relatively low value in the present embodiment, e.g., 0.1<k<0.5 for example, and in one example may be set to within the range of 0.2<k<0.4. While the value of k may exceed 0.5, setting the value of k to a value smaller than 0.5 enables the advantages unique to resonant magnetic coupling to be yielded, which are increased distance between the transmission/reception antennas, and not being readily affected by asymmetry the sizes of the transmission/reception antennas. The Q value of the resonators making up the antennas is dependent on the transmission efficiency of inter-antenna power transmission required by the system, and the value of the coupling coefficient k, but may be set to a value in the tens to a 100 for example, or in one example to a value larger than 100.

Figure 6:
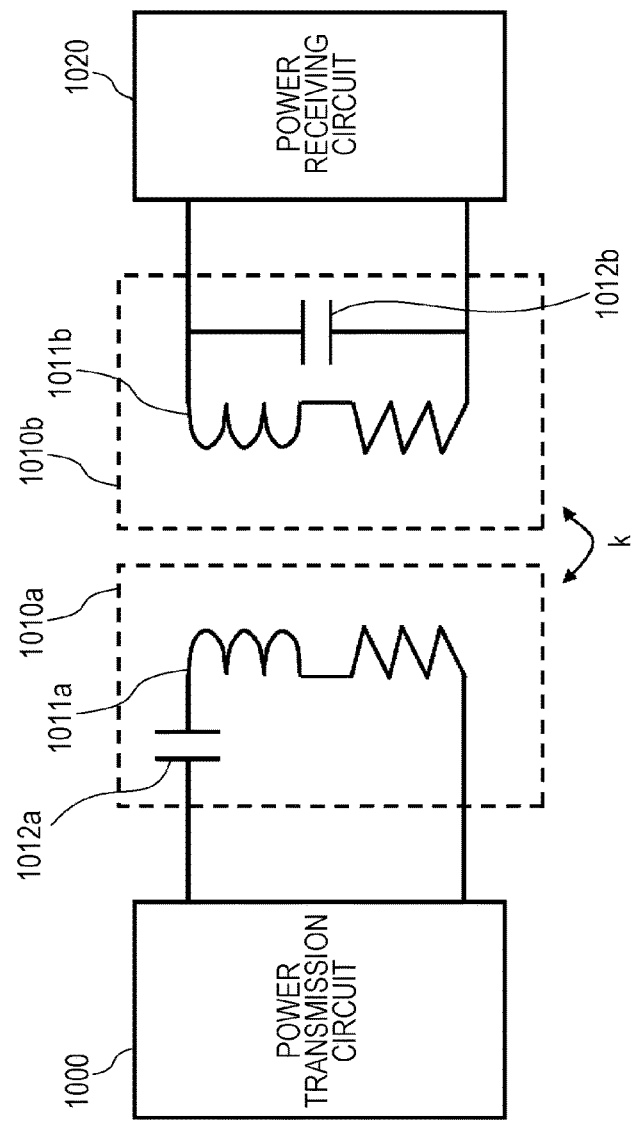
FIG. 6 is a diagram illustrating an example of an equivalent circuit of a power transmission antenna and power receiving antenna in the first embodiment.

FIG. 6 is a diagram illustrating an example of an equivalent circuit of a power transmission antenna 1010a and power receiving antenna 1010b. In the example illustrated in FIG. 6, the power transmission antenna 1010a is a serial resonance circuit where an inductor 1011a and a capacitor 1012a have been connected serially. The power transmission antenna 1010b is a serial resonance circuit where an inductor 1011b and a capacitor 1012b have been connected serially. The power transmission antenna 1010a and the power receiving antenna 1010b also have capacitive resistance. The power transmission antenna 1010a and power receiving antenna 1010b are not restricted to the illustrated example, and may be either serial resonance circuits or parallel resonance circuits.

Although the transmission/receiving antenna 1010 transmits power by resonant magnetic coupling in the present embodiment, power may be transmitted by the conventional electromagnetic induction method. In this case, the coupling coefficient of the antennas is set to a value close to 1.

Next, control methods by the control circuitry 1009 according to the present embodiment will be described. In the present embodiment, one of the two following control methods can be employed.

Control Method 1: Phase Control→Frequency Control

Figure 7:
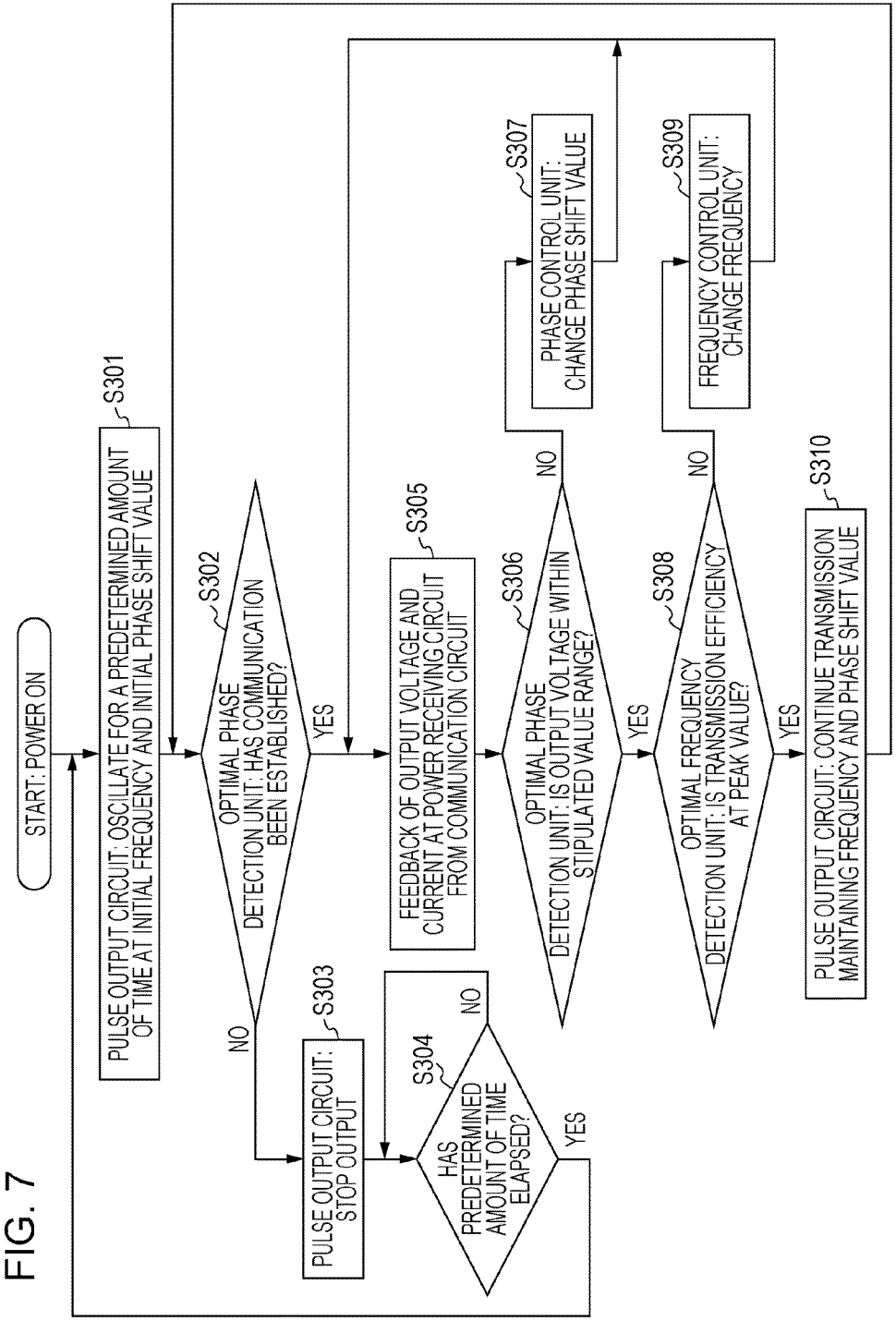
FIG. 7 is a flowchart illustrating processing according to a first example of a control method in the first embodiment.

First, a first example of a control method according to the present embodiment will be described. FIG. 7 is a flowchart illustrating processing according to the present control method. Upon receiving DC energy from the DC source 1030, the input detection circuit 1002 in the power transmission device 1000 detects the voltage and current input from the DC source 1030, and outputs the detection results to the optimal phase detection unit 1004 and optimal frequency detection unit 1006. The phase control unit 1003 and frequency control unit 1005 each output information indicating the initial frequency and phase shift value determined beforehand to the pulse output circuit 1007. Based upon this, the pulse output circuit 1007 outputs an oscillation control pulse having this frequency and phase shift value to the gates of the switching devices of the oscillator 1001 (initial transmission). Accordingly, the oscillator 1001 converts the DC energy supplied from the DC source 1030 into AC energy, and sends to the power receiving device 1020 through the transmission/receiving antenna 1010 (step S301).

Next, the optimal phase detection unit 1004 determines whether or not communication has been established with the power receiving device 1020 (step S302). Whether or not communication has been established is determined by whether or not detection results by the output detection circuit 1022 have been communicated from the communication circuit 1023 at the power receiving side, which will be described later. In a case where communication has not been established, the phase control unit 1003 and frequency control unit 1005 cause the pulse output circuit 1007 to stop output pulses (step S303). Thereafter, the flow goes into standby until a predetermined amount of time elapses (step S304), and after the predetermined amount of time elapses, returns to step S301 again.

In a case where determination is made in step S302 that communication has been established, the optimal phase detection unit 1004 and optimal frequency detection unit 1006 receive feedback regarding the output voltage and current at the power receiving device, from the communication circuit 1023 (step S305). Specifically, upon the power receiving device 1020 receiving energy from the DC source 1030 transmitted via the oscillator 1001 and transmission/receiving antenna 1010, the output detection circuit 1022 first detects the voltage and current supplied to the load 1040, and outputs the detection results to the communication circuit 1023. The communication circuit 1023 conveys the detection results by the output detection circuit 1022 to the optimal phase detection unit 1004 and optimal frequency detection unit 1006.

As for the method of conveyance at this time, there is a method, for example, where a switch to change load impedance is provided at the output end of the rectifier circuit 1021, and the switch is turned on/off at a frequency sufficiently different from that of the oscillator 1001. That is to say, resistance and capacitive is provided in parallel to the load, and the load impedance is changed by switching conduction of the connection. The input/output of the power transmission device 1000 changes according to change in the load impedance, so the detection results of the output detection circuit 1022 can be subjected to frequency modulation by turning the switch on/off, and conveyed to the power transmission device 1000 as information. The power transmission device 1000 can detect fluctuation in voltage at both ends of the power transmission antenna 1010a occurring due to the on/off of the switch, and change and the amount of current occurring at the input end of the oscillator 1001, and read the conveyed information by demodulating the detection results. The method of conveying information is not restricted to the above-described method. Information may be transmitted by an entirely different communication method, such as near field communication (NFC), a wireless local area network (LAN), or the like.

Due to this sort of method, the optimal phase detection unit 1004 can determine in step S302 whether or not communication has been established. That is to say, determination is made that communication has been established when information from the power receiving side can be demodulated. On the other hand, when information from the power receiving side cannot be demodulated, determination is made that communication has not been established.

After having received feedback from the power receiving device, the optimal phase detection unit 1004 determines whether or not the voltage output to the load 1040 is within the stipulated value range or not (step S306).

In a case where communication has been established, information of the target voltage and permissible stipulated value range for voltage, stored in the aforementioned memory, is communicated from the communication circuit to the receiving circuit of the power transmission circuit. The information of the target voltage and permissible stipulated value range for voltage regarding the load is stored in memory disposed at any location in the power transmission circuit. Note that the target voltage and permissible stipulated value range for voltage regarding the load has been described as being sent from the power receiving circuit to the power transmission circuit, but may be stored in any one memory within the power transmission circuit beforehand.

This determination is made by referencing a table stored beforehand in a storage media such as memory or the like that is omitted from illustration. In the present embodiment, a table indicating change in output voltage in accordance with the impedance of the load 1040, transmission frequency, and phase shift value, is stored. Also stored in the same way is a table indicating transmission efficiency in accordance to the impedance of the load 1040 and transmission frequency, this table being referenced in step S309 described later. FIGS. 8 and 9 illustrate an example of such tables. These tables are compiled based on experimentation and simulation beforehand, for each value of the input voltage at the power transmission side. Note that the tables illustrated in FIGS. 8 and 9 may be integrated into a single table, or may be further broken down. By referencing a table such as illustrated in FIG. 8, the optimal phase detection unit 1004 detects an optimal phase shift value, based on the values of output voltage and output current conveyed from the communication circuit 1023, and the value of input voltage detected by the input detection circuit 1002.

The optimal phase detection unit 1004 first calculates the difference between the output voltage detected at the power receiving side and the target voltage to be output that has been set beforehand, and determines whether or not the difference is within a predetermined range (step S306). In a case where the difference is within a predetermined range, the processing is transitioned to the optimal frequency detection unit 1006. In a case where the difference is not within a predetermined range, processing is performed to change the phase shift value (step S307). At this time, the optimal frequency detection unit 1006 determines a change width Δθ' for the phase shift value, based on the load impedance value calculated from the output voltage/current values, the difference as to the above-described voltage, and the table, and outputs this information to the phase control unit 1003. In a case where the current output voltage value is higher than the target voltage value, Δθ' is a positive value, and if lower, Δθ' is a negative value.

The phase control unit 1003 obtains a new phase shift value (Δθt+Δθ') from the change width Δθ' of the phase shift value and the current phase shift value Δθt, and outputs this information to the pulse output circuit 1007. The pulse output circuit 1007 inputs oscillation control pulses corresponding to the new phase shift value (Δθt+Δθ') to the oscillator 1001. Specifically, the phases of the pulses are charged so that the phases of the pulses input to the switching devices S3 and S4 are each shifted by (Δθt+Δθ') as compared with the phases of the pulses input to the switching devices S1 and S2. Thereafter, the flow returns to step S305, and in step S306 processing is performed to charge the phase shift value until the optimal phase detection unit 1004 determines that the difference between the output voltage and the target voltage value is within the predetermined range.

While description has been made here that the phase shift value is determined based on the tables, an arrangement may be made where a change formula gives the difference as to the target value, instead of being values being stored in a table. Further, the change width Δθ' of the phase shift value may be set as a constant value set beforehand, and the phase shift value obtained.

In a case where determination is made by the optimal phase detection unit 1004 in step S306 that the output voltage is within the predetermined value range, the optimal frequency detection unit 1006 determines whether or not the transmission efficiency has reached the peak value (step S308). The power transmission device 1000 has memory that stores and holds the table of transmission efficiency corresponding to the load impedance value and frequency (FIG. 9), and the transmission efficiency before changing the frequency.

The optimal frequency detection unit 1006 receives input from the communication circuit 1023 and input from the input detection circuit 1002, calculates the current transmission efficiency by calculating the ratio of power of the two, and compares this with the transmission efficiency from the previous time that is stored and held in the memory. In a case where the results of the comparison are that the current transmission efficiency is higher than the transmission efficiency the previous time, determination is made that the peak value has not been reached yet, and processing is performed to change the frequency (step S309). Specifically, the optimal frequency detection unit 1006 determines the charge width of frequency based on the table of transmission efficiency corresponding to the load impedance and transmission frequency, and outputs the results to the frequency control unit 1005. The frequency control unit 1005 obtains a new frequency from the determined frequency change width and the current frequency, and notifies the pulse output circuit 1007. The pulse output circuit 1007 outputs the oscillation control pulses of the newly-determined frequency to the oscillator 1001.

Thus, the output voltage of the power receiving device 1020 charges as a result of performing oscillation at the new frequency. Accordingly, the processing of steps S305 through S307 is performed again, and the phase shift value is adjusted by the optimal phase detection unit 1004 and the phase control unit 1003 so that the output voltage draws closer to the target voltage value. Thereafter, the frequency control and phase control is repeatedly performed unit the new transmission efficiency is lower than the transmission efficiency the previous time, and determination is made that the peak has been reached. Thus, the optimal frequency detection unit 1006 can detect the peak point, and at the same time bring the output voltage of the power receiving device 1020 near to the target voltage value by way of the optimal phase detection unit 1004.

Finally, when the new transmission efficiency is lower than the transmission efficiency the previous time (Yes in step S308), the phase control unit 1003 and frequency control unit 1005 each notify the pulse output circuit 1007 of the phase shift value from the previous time and the frequency from the previous time. the pulse output circuit 1007 maintains transmission by output pulses corresponding to this frequency and phase shift value (step S310). Thus, the optimal frequency detection unit 1006 can detect a frequency where the transmission efficiency is the highest, and at the same time, the optimal phase detection unit 1004 can detect a phase difference which beings the output voltage of the power receiving device 1020 to the target voltage. Accordingly, the transmission efficiency can be maintained at a high level, while keeping the target voltage value at the power receiving side.

Control Method 2: Frequency Control→Phase Control

Figure 10:
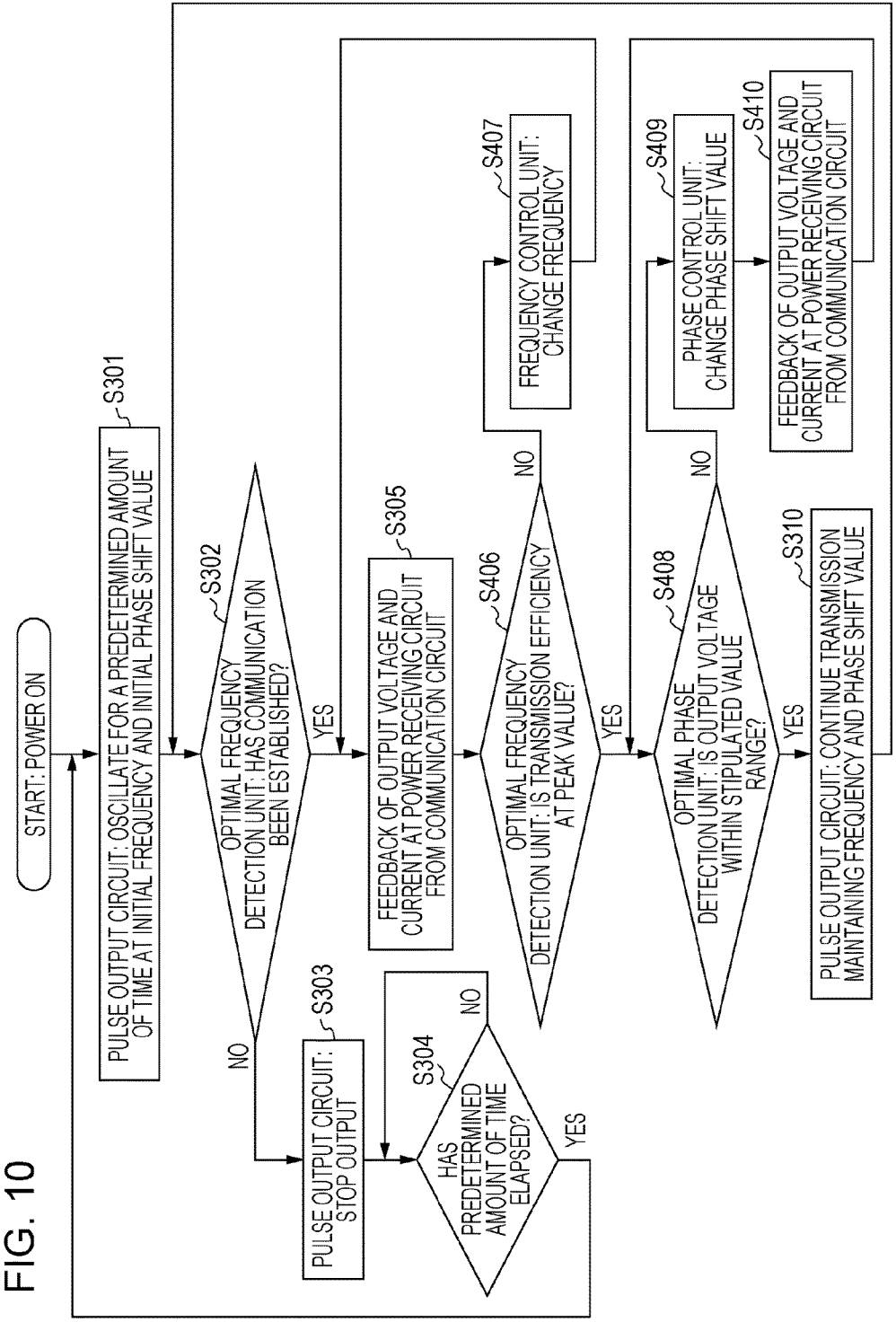
FIG. 10 is a flowchart illustrating processing according to a second example of a control method in the first embodiment.

Next, a second example of a control method according to the present embodiment will be described. FIG. 10 is a flowchart illustrating processing according to the present control method. The present control method is the same as the above-described first example, except that steps S406 through S410 are performed instead of steps S306 through S309 in the above first example. Accordingly, primarily points that differ from the first example will be described. The present control method differs from the first example in that phase control is performed after frequency control has been performed.

In the same way as the above first example, the initial transmission is performed in step S301, after which the processing of steps S302 through S305 is performed, and the optimal frequency detection unit 1006 determines whether or not the current transmission efficiency has attained a peak value (step S406). Specifically, the optimal frequency detection unit 1006 receives input from the communication circuit 1023 and input from the input detection circuit 1002, calculates the current transmission efficiency by calculating the ratio of power of the two, and compares this with that stored and held in the memory. In a case where the results of the comparison are that the current transmission efficiency is higher than the transmission efficiency the previous time, processing is performed to change the frequency (step S407). At this time, the optimal frequency detection unit 1006 determines the charge width of frequency based on the table of transmission efficiency corresponding to the load impedance and transmission frequency (FIG. 8), and outputs the information to the frequency control unit 1005. The frequency control unit 1005 obtains a new frequency from the determined frequency change width and the current frequency, and notifies the pulse output circuit 1007. The pulse output circuit 1007 inputs the oscillator 1001 with oscillation control pulses corresponding to the new frequency that has been notified. The flow then returns to step S305, and in step S406 similar frequency control is repeated until the optimal frequency detection unit 1006 detects that the new transmission efficiency is lower than the transmission efficiency from the previous time. The optimal frequency detection unit 1006 thus determines the transmission frequency which is at the peak point of transmission efficiency.

Upon the transmission frequency which is at the peak point of transmission efficiency being determined in step S406, the optimal phase detection unit 1004 determines whether or not the output voltage is within the stipulated value range (step S408). In the same way as with the above first example, the difference between the output voltage input from the communication circuit 1023 and the predetermined target voltage to be output is calculated, and if this difference within the predetermined value range, determination is made that the output voltage is within the predetermined value range. The phase control unit 1003 and frequency control unit 1005 at this time output the current phase shift value and frequency to the pulse output circuit 1007 to maintain transmission (step S310). On the other hand, in a case where the difference between the output voltage and target voltage is outside of the predetermined value range, processing is performed to change the phase shift value (step S409). Specifically, a change width is determined for the phase shift value, based on the load impedance value calculated from the output voltage/current values, the above-described difference in voltage, and the table illustrated in FIG. 8, and this information is output to the phase control unit 1003. The phase control unit 1003 calculates a new phase shift value from the charge width of the phase shift value and the current phase shift value, and outputs this information to the pulse output circuit 1007. The pulse output circuit 1007 outputs oscillation control pulses corresponding to the newly-determined phase shift value to the oscillator 1001. Thereafter, the optimal phase detection unit 1004 gets feedback of the output voltage and current at the power receiving device 1020 from the communication circuit (step S410), and performs the determination processing in step S408. The optimal phase detection unit 1004 performs control to change the phase shift value until the difference between the current output voltage and target voltage value is within the predetermined value range.

Thus, according to the present control method, the optimal frequency detection unit 1006 detects a transmission frequency where the transmission efficiency reaches the peak point, and next the optimal phase detection unit 1004 detects a phase shift value where the output voltage of the power receiving device 1020 draws near to the target voltage value. Accordingly, both transmission efficiency and constant voltage output can be realized.

First Exemplary Embodiment

Figure 11A:
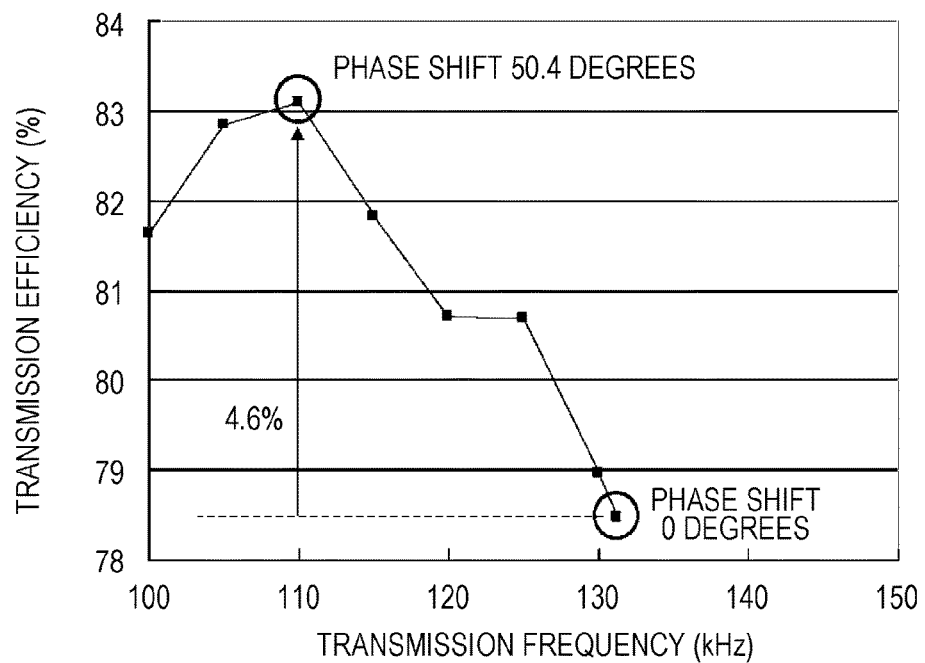
FIG. 11A is a diagram illustrating effects of voltage stabilization and improvement in transmission efficiency in a case where the load is 5 Ω in a first exemplary embodiment.

Next, a first exemplary embodiment of the above-described wireless power transmission system control method will be described. In the present exemplary embodiment, the effects of the present embodiment were verified by using a circuit simulator to compare change in transmission efficiency, using a circuit model where the above-described control is performed. A configuration the same as that in the first embodiment was used in the present exemplary embodiment. The specifications of the power transmission antenna were inductance value of 40 mF, resistance value as to frequency f0 of 1.86 f0-mΩ, and resonance capacitor capacity of 73 pF. The specifications of the power receiving antenna were inductance value of 25.84 mF, resistance value as to frequency f0 of 2.22 f0-mΩ and resonance capacitor capacity of 750 pF. DC voltage Vdc of a DC source 1030 was 12 V, target voltage of a power receiving device 1020 was 5 V, a frequency sweep range was 110 kHz to 140 kHz, and the load impedances were 5 Ω, 10 Ω, and 20 Ω. FIG. 11A is a graph illustrating charge in transmission efficiency with regard to transmission frequency and phase shift value at a load of 5 Ω. In the same way, FIGS. 11B and 11C respectively illustrate graphs at a load of 10 Ω and at a load of 20 Ω.

Figure 11B:
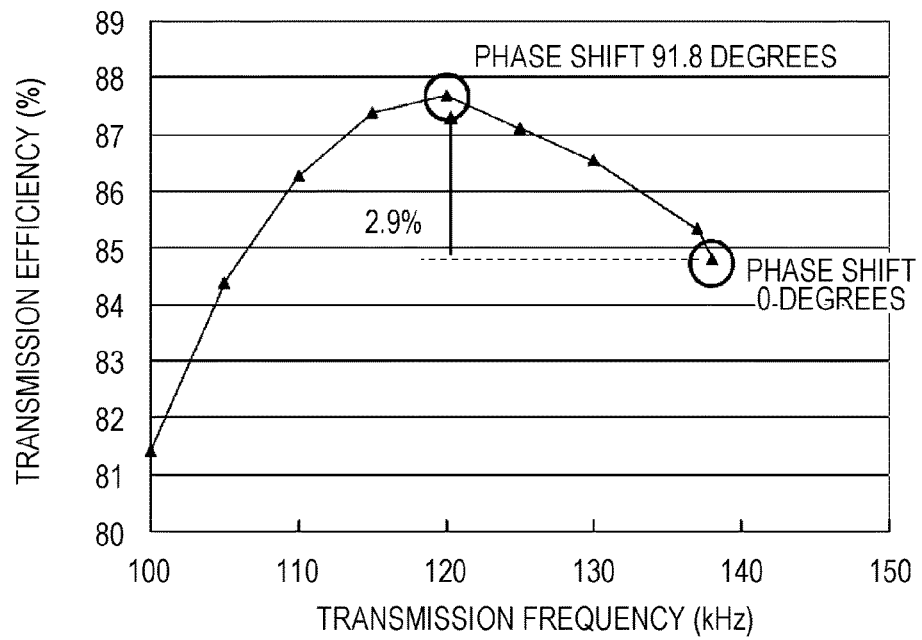
FIG. 11B is a diagram illustrating effects of voltage stabilization and improvement in transmission efficiency in a case where the load is 10 Ω in the first exemplary embodiment.

As illustrated in FIGS. 11A through 11C, the transmission efficiency of the overall system where the control according to the first embodiment was carried out improved over controlling frequency alone (case of phase shift 0 degrees) by as much as approximately 4.6%, approximately 2.9%, and approximately 1%, for the respective loads of 5 Ω, 10 Ω, and 20 Ω. It was thus found that the effects of control according to the present embodiment were pronounced, as illustrated in FIGS. 11A through 11C.

Figure 12:
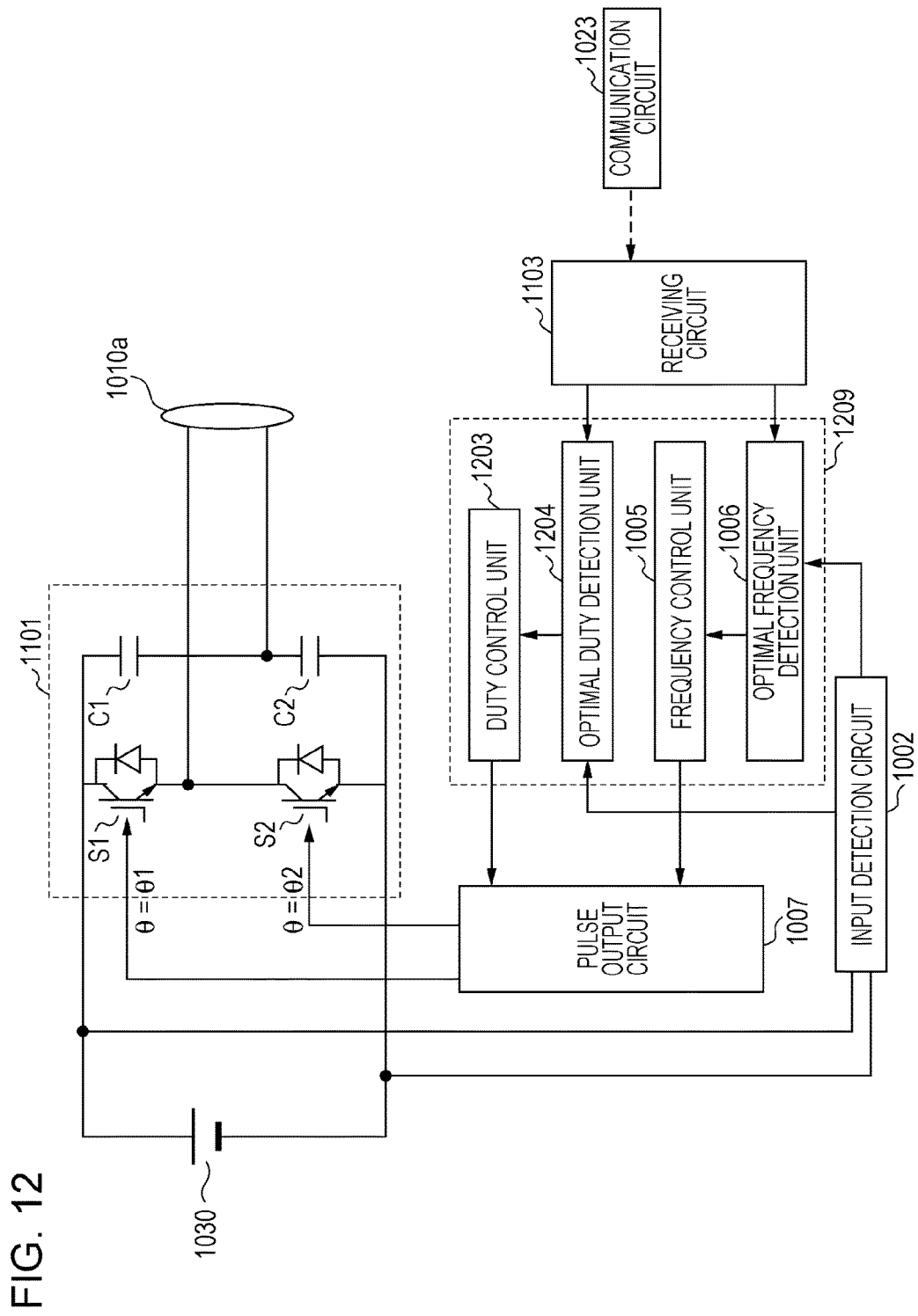
FIG. 12 is a block diagram illustrating a modification where the configuration of the oscillation unit in the first embodiment has been changed.

A modification of the first embodiment of the present disclosure will be described. FIG. 12 is a block diagram illustrating an example where the configuration of the oscillator has been changed. This example differs from the first embodiment with regard to the points that the oscillator has two switching devices instead of four, and the control circuitry controls the duty cycle of the pulses instead of controlling the phase difference (phase shift value) of the two pulses. Other configurations are the same as those of the first embodiment.

An oscillator 1101 in FIG. 12 includes two switching devices S1 and S2, and two capacitors C1 and C2. The pair of the two switching devices S1 and S2, and the pair of the two capacitors C1 and C2, are connected in parallel as to the DC source 1030. The oscillator 1101 and the power transmission antenna 1010a are connected by wiring extending from between the switching devices S1 and S2, and from between the capacitors C1 and C2. DC power is converted into AC power by the pulse output circuit 1007 alternately inputting pulses to the gates of the switching devices.

A control circuitry 1209 in FIG. 12 includes an optimal duty detecting unit 1204 and a duty control unit 1203, instead of the optimal phase detection unit 1004 and the phase control unit 1003 in the first embodiment. These components change the duty cycle of the pulses input to the switching devices S1 and S2, thereby changing the output time ratio of voltage output from the oscillator 1001. Thus, the output voltage for the load can be brought closer to being constant.

In the control according to the first embodiment, processing of changing the duty cycle of the pulses is performed instead of step S307 in FIG. 7 or step S409 in FIG. 10, for example. Accordingly, a table is prepared beforehand in which are recorded amounts of change of duty cycle, instead of the phase shift values in the table illustrated in FIG. 8. This control enables high transmission efficiency to be maintained while maintaining the output voltage constant, in the same way as with the first embodiment.

Note that duty control may be performed instead of phase control, even in a configuration using four switching devices such as that according to the first embodiment. Also, phase control and duty control may be performed in conjunction. Note however, that in a case of performing duty control, the duty cycle is desirably within a range of 45% or higher, to reduce noise due to return current that occurs in a case where all switching devices are on the off state. The rate of phase control is desirably high in a case of using phase control and duty control in conjunction, for the same reason. Further, the number of switching devices is not restricted to two or four; even more switching devices may be provided. Any configuration may be used for the wireless power transmission system according to the present disclosure, as long as pulse control is performed where the frequency and output time ratio of voltage output from the oscillator are adjusted based on the voltage and current input to the power transmission device and the voltage and current output from the power receiving device.

Second Embodiment

Control Method 3

Next, a second embodiment will be described. The control method according to this embodiment of the present disclosure is a third example. In the first embodiment, information fed back from the power receiving device 1020 was the values of the voltage and current output to the load 1040. However, the feedback information may be the difference between preset output voltage and current values, and values detected by the output detection circuit (error values). The second embodiment will be described by way of an example of a case of feedback of error values.

Figure 13:
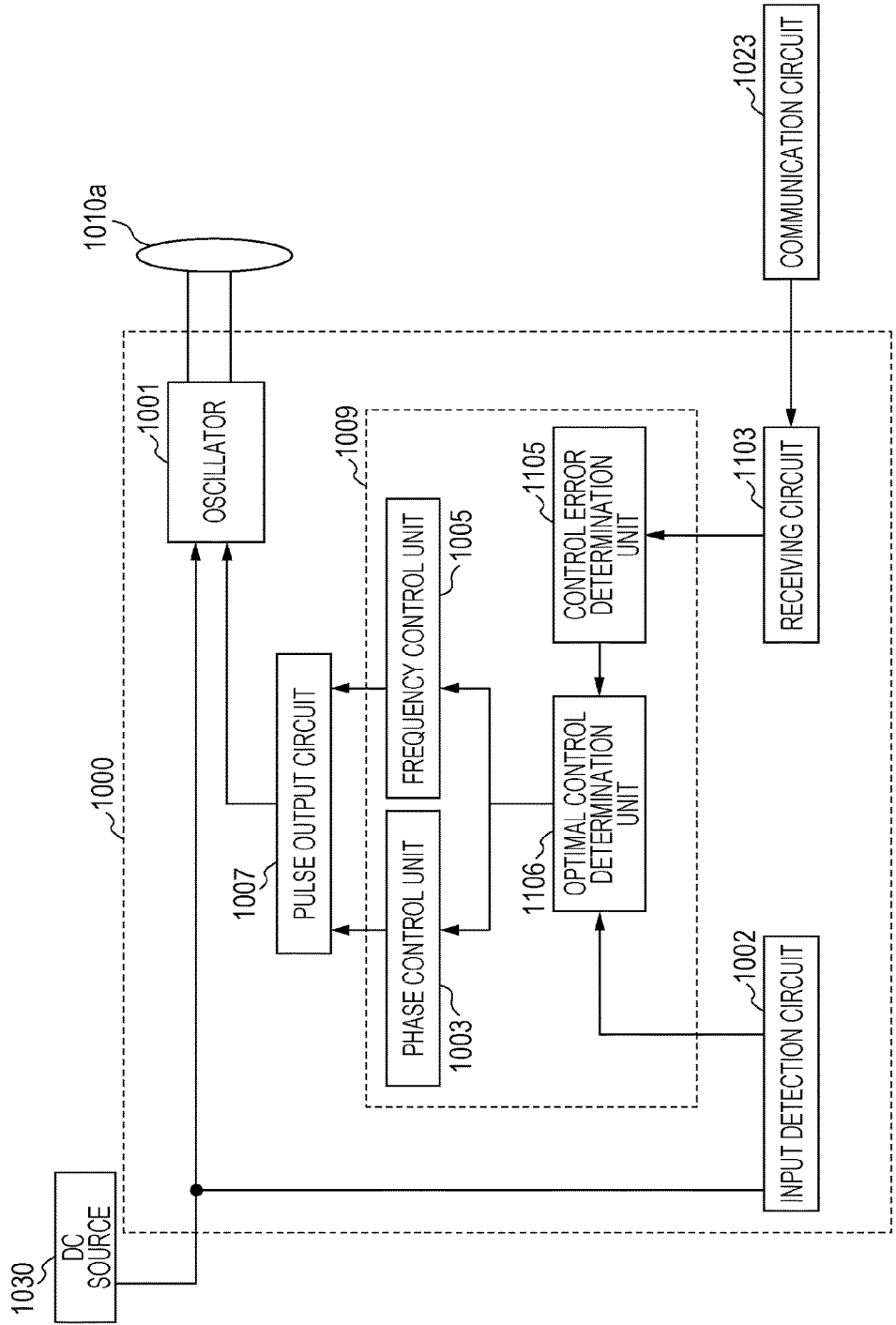
FIG. 13 is a diagram illustrating a schematic configuration of a power transmission device according to a second embodiment.

FIG. 13 is a block diagram schematically illustrating components of the present embodiment, and components which are in common with FIG. 2A are denoted by the same reference numerals. FIG. 13 illustrates four functional blocks realized by the control circuitry 1009. Specifically, these are a control error determination unit 1105, an optimal control determination unit, the frequency control unit 1005, and the phase control unit 1003. The control circuitry 1009 may be realized by a combination of a CPU and a computer program stored in memory, for example. The functions of the functional blocks in FIG. 13 are realized by the CPU executing a command set described in the computer program. Alternatively, the same functions may be realized by hardware such as a DSP or the like where a computer program has been installed in one semiconductor circuit.

The control error determination unit 1105 determines whether or not the value of error, which control error information transmitted from the receiving circuit 1103 indicates, is within a predetermined range. The optimal control determination unit 1106 determines an optimal pulse timing which maintains the voltage input to the load at a desired value, and also brings the transmission efficiency near to maximum, based on the determination results of the control error determination unit 1105 and the detection results of the input detection circuit 1002. Specifically, the frequency and phase shift amount of pulses to be output are determined, and information thereof is transmitted to each of the frequency control unit 1005 and the phase control unit 1003. The phase control unit 1003 and frequency control unit 1005 drive the pulse output circuit 1007 based on the information sent from the optimal control determination unit 1106.

The pulse output circuit 1007 is, for example, a known gate driver, and generates pulses for input to the switching devices of the oscillator 1001, based on information of phase and shift amount frequency input from the phase control unit 1003 and the frequency control unit 1005.

The pulse output circuit 1007 detects at least one of current and voltage input from the DC source 1030. In a case where the DC source 1030 is a constant voltage source, the input detection circuit 1002 may be configured to detect at least current. In a case where the DC source 1030 is a constant current source, the input detection circuit 1002 may be configured to detect at least voltage. Accordingly, pulses input to the switching devices of the oscillator 1001 from the pulse output circuit 1007 can be controlled, so that the power consumption of the power transmission device 1000 is minimized. The following description will be made assuming that the DC source 1030 is a constant voltage source.

Figure 14A:
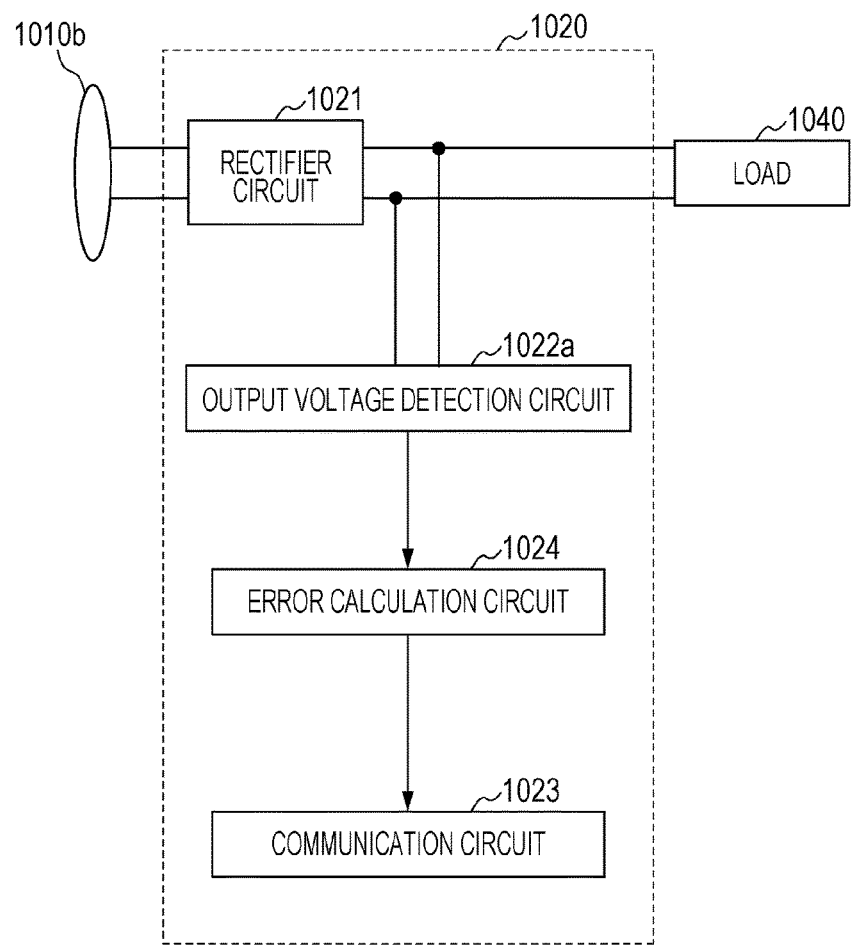
FIG. 14A is a diagram illustrating a schematic configuration of a power receiving device according to the second embodiment.

FIG. 14A is a diagram illustrating a configuration example of the output detection circuit 1022 in the power receiving device 1020. In this example, the output detection circuit 1022 is realized as an output voltage detection circuit 1022a. The output voltage detection circuit 1022a detects voltage supplied to the load 1040 and outputs detection results to an error calculation circuit 1024. The error calculation circuit 1024 generates control error information indicating the difference between the detected voltage and a predetermined voltage that the power receiving device 1020 requires. The communication circuit 1023 conveys this control error information to the receiving circuit 1103 within the power transmission device 1000.

Figure 14B:
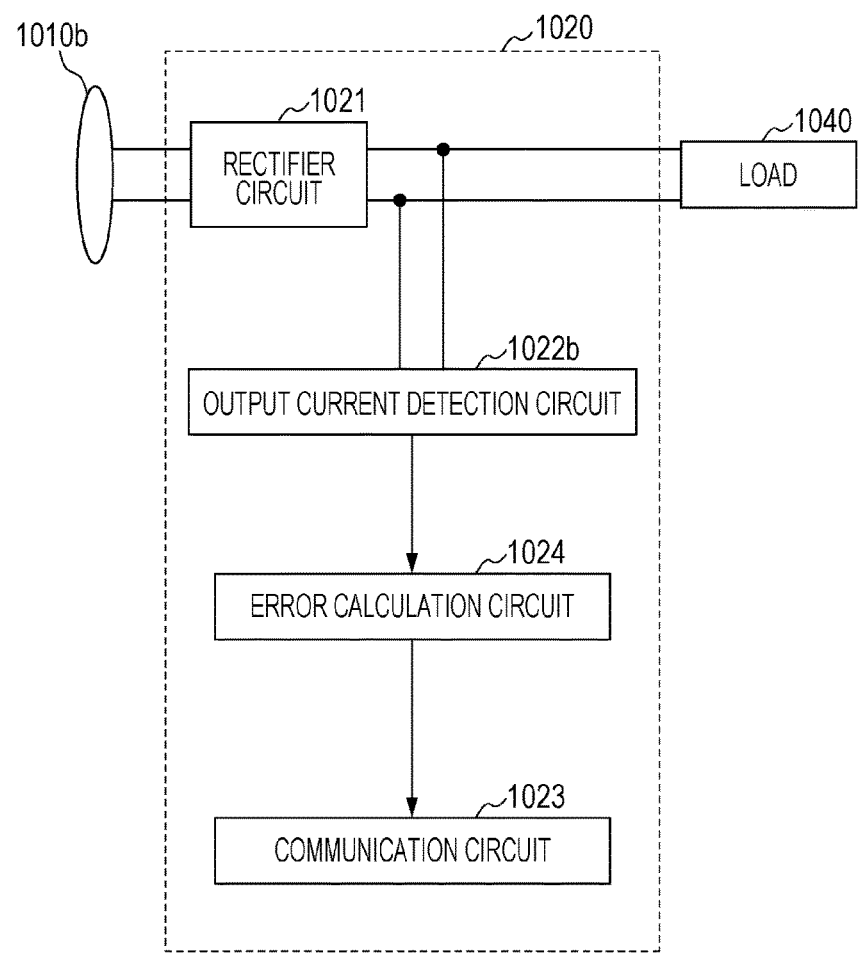
FIG. 14B is a diagram illustrating a schematic configuration of the power receiving device according to the second embodiment.

Note that in the example illustrated in FIG. 14A, the control error information is calculated based on voltage supplied to the load, but the control error information may be calculated based on current or power instead. FIG. 14B is a diagram illustrating another configuration example of the output detection circuit 1022 in the power receiving device 1020. In this example, the output detection circuit 1022 is realized as an output current detection circuit 1022b. The output current detection circuit 1022b detects current supplied to the load 1040 and outputs detection results to the error calculation circuit 1024. The error calculation circuit 1024 generates control error information indicating the difference between the detected current and a predetermined current that the power receiving device 1020 requires. The communication circuit 1023 conveys this control error information to the receiving circuit 1103 within the power transmission device 1000.

Figure 14C:
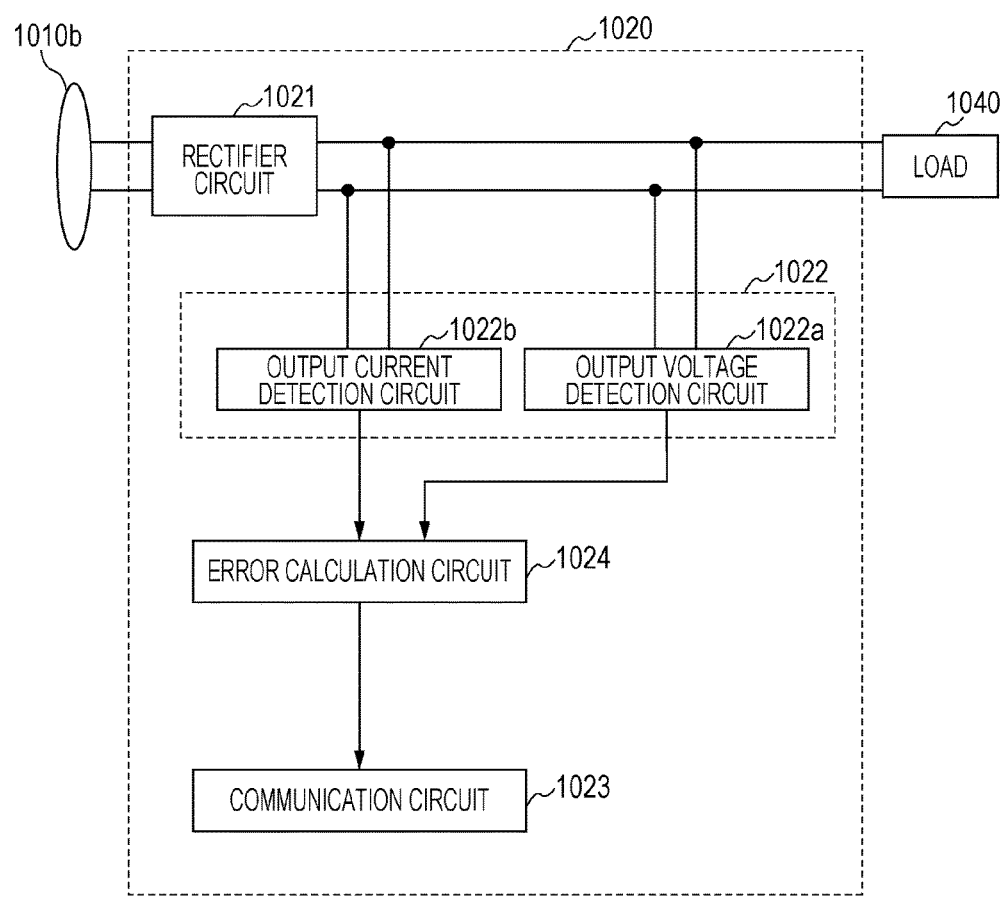
FIG. 14C is a diagram illustrating a schematic configuration of the power receiving device according to the second embodiment.

FIG. 14C is a diagram illustrating another configuration example of the output detection circuit 1022 in the power receiving device 1020. In this example, the output detection circuit 1022 is realized as the output voltage detection circuit 1022a and the output current detection circuit 1022b. The output voltage detection circuit 1022a and output current detection circuit 1022b respectively detect voltage and current supplied to the load 1040 and output the detection results to the error calculation circuit 1024. The error calculation circuit 1024 calculates power from the information of the detected voltage and current, and generates control error information indicating the difference between this power and a predetermined power that the power receiving device 1020 requires. The communication circuit 1023 conveys this control error information to the receiving circuit 1103 within the power transmission device 1000.

The method of conveying information from the communication circuit 1023 in the power receiving device 1020 to the receiving circuit 1103 in the power transmission device 1000 may be the same as that in the first embodiment described above, so description will be omitted here.

The control error information may be obtained by the following calculation, for example.

(value of control error information)=required value−(detected value)

where the detected value is the value of voltage, current, or power, input to the load 1040 after the AC energy received by the power receiving device 1020 has been converted into DC energy. The required value is the value of voltage, current, or power that the power receiving device 1020 requires. If the control error information is a positive value, this means that supply is insufficient as to what the power receiving device 1020 requires. IF negative, this means that supply is excessive, and if the control error is 0, this means that the supply amount is appropriate. The way of deciding values for the control error information is not restricted to the above example; information indicating the difference between detected values and required values is sufficient. This also is not restricted to numerical values indicating the difference itself, and may be numerical values converted from the difference.

As described above, it is sufficient for the output detection circuit 1022 to be configured so as to detect at least one of voltage applied to the load 1040 and current flowing through the load 1040. The "voltage applied to the load 1040" may be voltage that changes in conjunction with the voltage directly input to the load 1040, and not just the voltage directly input to the load 1040. In the same way, the "current flowing through the load 1040" may be current that changes in conjunction with the current directly input to the load 1040, and not just the current directly input to the load 1040. For example, in a case where there is a circuit element or branch point, not illustrated in the drawings, situated between the rectifier circuit 1021 and the load 1040, the voltage or current may be detected between the circuit element or branch point and the rectifier circuit 1021.

Next, the operations of the control circuitry 1009 according to the present embodiment will be described. Although a case of generating control error information based on voltage is assumed here, as illustrated in FIG. 14A, the following operations are the same for cases of generating control error information based on current or power.

FIG. 15 is a flowchart illustrating processing by the control circuitry 1009. Upon the power transmission device 1000 receiving DC energy from the DC source 1030, the phase control unit 1003 and frequency control unit 1005 each output information indicating the initial frequency and phase shift value determined beforehand to the pulse output circuit 1007. Based upon this, the pulse output circuit 1007 outputs an oscillation control pulse having this frequency and phase shift value to the gates of the switching devices of the oscillator 1001 (initial transmission). Accordingly, the oscillator 1001 converts the DC energy supplied from the DC source 1030 into AC energy, and sends to the power receiving device 1020 through the transmission/receiving antenna 1010 (step S400).

Next, the control error determination unit 1105 acquires control error information generated at the power receiving device 1020, from the receiving circuit 1103 (step S401). Upon the power receiving device 1020 receiving the energy transmitted from the DC source 1030 sent via the oscillator 1001 and transmission/receiving antenna 1010, the output detection circuit 1022 first detects output voltage supplied to the load 1040, and sends control error information, indicating the difference between the detection results and a desired value, to the communication circuit 1023. The communication circuit 1023 conveys the control error information to the receiving circuit 1103.

After having received feed back of the control error information from the power receiving device, the control error determination unit 1105 determines whether or not control error information is within a predetermined range (step S402). If the error is outside of the predetermined range, the optimal control determination unit 1106 instructs the frequency control unit 1005 to change the frequency by a predetermined value so that the control error is reduced (step S403). Thereafter, the flow returns to step S401, and the control error determination unit 1105 acquires control error information again via the receiving circuit 1103. The processing of changing the frequency in step S403 is repeated until determination is made in step S402 that the control error information is within the predetermined range. Upon determination being made in step S402 that the control error information is within the predetermined range, the control circuitry 1009 advances the processing to efficiency search steps from step S501 and thereafter.

Step S401 through step S403 are steps to bring the output voltage within to a predetermined range, and are preliminary preparation before the efficiency search. Adjustment of output voltage by controlling the phase shift amount only has the function of lowering voltage, so in a case where the phase shift amount is 0 degrees and the voltage is below a predetermined voltage value which the power receiving device requires at a particular frequency, output adjustment by phase control cannot be performed at that frequency. Accordingly, the control circuitry 1009 executes steps S401 through S403 as preparatory steps to determine an upper limit frequency, so that the output voltage is a predetermined voltage value or higher when the frequency is changed (lowered in the present embodiment).

In a case where the coils of the antennas have been designed beforehand so that the received voltage is sufficiently high at all frequency bands that are used, step S401 through step S403 may be omitted. Although description has been made in the present embodiment that only the frequency is changed in step S403 so that the control error is reduced, in cases where the required value for the received voltage is too high and the condition of bringing the control error within the predetermined range by changing frequency alone cannot be satisfied, phase shift amount may be changed in addition to the frequency.

The efficiency search steps will be described below. In the efficiency search steps, a first operation of changing the phase shift amount in increments of a predetermined value, so that the error indicated by the control error information comes within the predetermined range (steps S502 through S504), and after the first operation is completed, a second operation of changing the frequency in increments of a predetermined value so that the value indicated by the detection results of the input detection circuit (current value in this case) approaches the minimal value (steps S505 and S506), are repeated. More specifically, after executing the second operation to change frequency, the control circuitry 1009 acquires control error information again without changing the phase shift amount, and if the error indicated by the control error information is not within the predetermined range, takes the phase shift amount at this time as the initial value and re-executes the first operation. By repeating these operations, the transmission efficiency can be optimized by maintaining the output voltage to the load at a constant level. Hereinafter, individual processes will be described in detail.

First, the frequency control unit 1005 takes the detection value of the input detection circuit as a tentative minimal value and records this in a recording medium such as memory or like that is omitted from illustration, and changes the frequency by a predetermined value (step S501). Next, the control error determination unit 1105 acquires control error information transmitted from the receiving circuit 1103 (step S502). Subsequently, the control error determination unit 1105 determines whether or not the value of the control error information is within the predetermined range (step S503). If the error is outside of the predetermined range, the phase shift amount is changed by a predetermined value so that the control error is reduced (step S504). Thereafter, the flow returns to step S502, and the processing of changing the phase shift amount is repeated until determination is made in step S503 that the control error information is within the predetermined range.

Upon determination being made in step S503 that the control error information is within the predetermined range, processing is transitioned to the optimal control determination unit 1106, and determination is made regarding whether or not the value of the current detected by the input detection circuit 1002 of the power transmission device 1000 is larger than the value the previous time (step S505). In other words, determination is made regarding whether or not the current value has reached the minimal value. In a case where the present current value is larger than the value of the current from the previous time, recorded in the recording medium such as memory or the like, this means that the value of the current the previous time was the minimal value. On the other hand, in a case where the present current value the same as or smaller than the value of the current from the previous time, determination can be made that the minimal value (smallest value) has not the been reached. Accordingly, the value stored in the recording medium and the present current value are compared, and in a case where the present current value is lower than the current value from the previous time, determination is made that the minimal value has not yet been reached, so this current value is recorded in the storage medium as a new tentative minimal value, and the frequency is changed by a predetermined number of steps (step S506).

Oscillating at this new frequency changes the output voltage of the power receiving device 1020. Accordingly, the control circuitry 1009 performs the processing of steps S502 through S505 again, performing processing to change the phase shift amount until determination is made that the error indicated by the control error information is within the predetermined range. If determination is made in step S503 that the control error is within the predetermined range as a result of the phase shift amount adjustment performed in step S504, determination is made again regarding whether or not the input current of the power transmission device (i.e., consumed power) is the smallest (Step S505). Eventually, when the new consumed power is higher than the consumed power from the previous time, determination is made that the consumed power at the frequency from the previous time was the smallest (Yes in step S505), so power transmission is continued for a predetermined amount of time with the frequency and the phase shift amount set to when the smallest (S507). Thereafter, when a predetermined amount of time (e.g., several seconds to several tens of seconds) has elapsed, the flow returns to step S502, and the search of step S502 through step S507 is repeated again, so that change in the load is constantly tracked. Accordingly, the transmission efficiency can be maintained at a high level while maintaining the target voltage value which the power receiving side requires.

Second Exemplary Embodiment

Figure 16A:
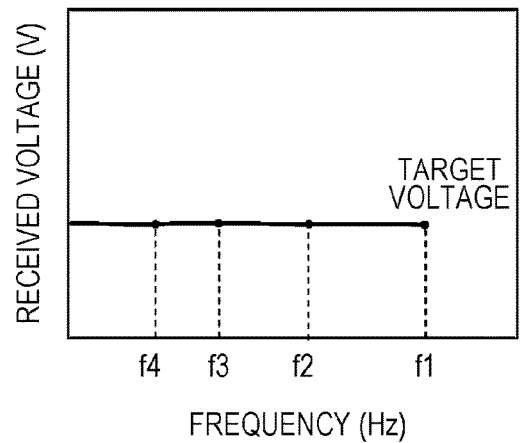
FIG. 16A is a diagram illustrating the relationship between transmission frequency and received voltage in a second exemplary embodiment.
Figure 16B:
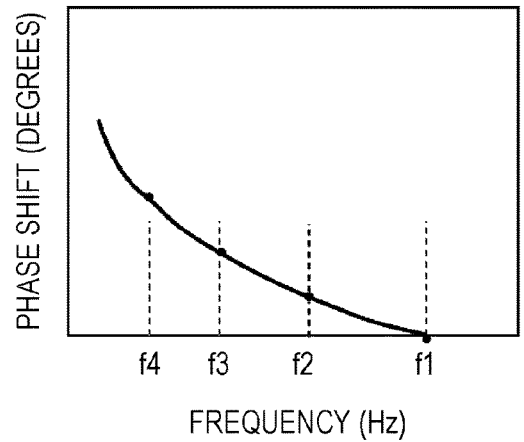
FIG. 16B is a diagram illustrating the relationship between transmission frequency and phase shift amount in the second exemplary embodiment.
Figure 16C:
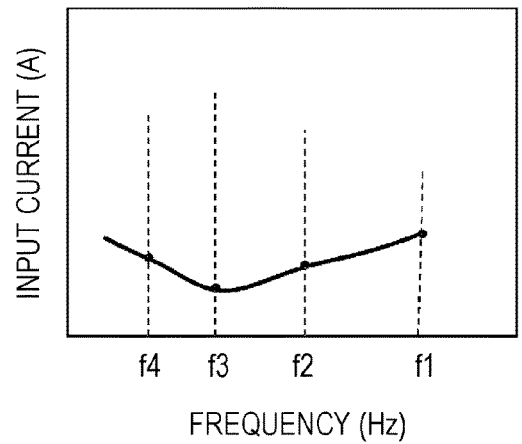
FIG. 16C is a diagram illustrating the relationship between transmission frequency and input current in the second exemplary embodiment.
Figure 16D:
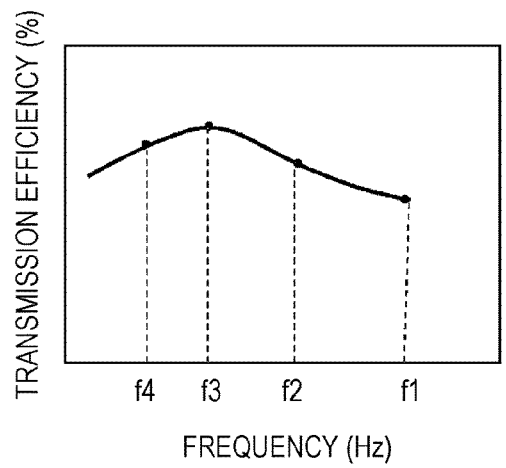
FIG. 16D is a diagram illustrating the relationship between transmission frequency and transmission efficiency in the second exemplary embodiment.

Next, a second exemplary embodiment according to the above-described third method will be described. FIGS. 16A through 16D illustrate an example of various properties when the conditions of maintaining the control error information within the predetermined range are satisfied in the wireless power transmission system according to the second embodiment, and the control error is infinitesimally small. FIGS. 16A through 16D are drawings where the horizontal axis represents frequency, and the plotted on the respective vertical axes are received voltage, phase shift amount, current consumed by the power transmission device 1000, and transmission efficiency. When the control error is maintained within the predetermined range, the received voltage is maintained at the constant target voltage even if the frequency is changed in the order of f1, f2, f3, and f4, as illustrated in FIG. 16A. In order to maintain the control error within the predetermined range, the phase shift amount is desirably change according to the frequency at each frequency, as illustrated in FIG. 16B. When the phase shift amount is controlled in this way, the current consumed by the power transmission device 1000 changes as illustrated in FIG. 16C, and the current becomes the smallest at frequency f3. On the other hand, the transmission efficiency changes as illustrated in FIG. 16D, and the efficiency is highest at frequency f3. From the above, it can be seen that the transmission efficiency is the highest at the frequency where the current consumption at the power transmission side is the lowest.

If the control error information is within the predetermined range, the voltage provided to the load is also maintained within the predetermined range, so the received power consumed at the load can be deemed to be constant when viewed over a span of time sufficiently shorter than intervals of load change. In this case, it is obvious that the transmission efficiency will be highest at the frequency where the power consumed at the power transmission side is smallest. On the other hand, power is expressed as voltage multiplied by current. In the present embodiment, the DC source 1030 is a constant voltage source, so the voltage input to the power transmission device 1000 is constant. That is to say, the power consumed at the power transmission side is smallest when the current consumed at the power transmission device 1000 is the smallest, and consequently, the transmission efficiency is the highest.

Figure 17:
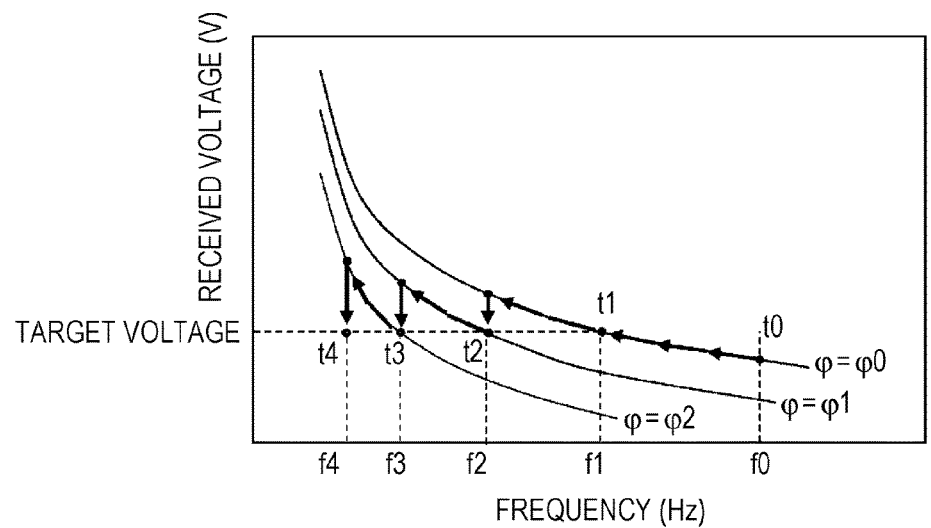
FIG. 17 is a schematic diagram illustrating an example of search control in the second embodiment.
Figure 18A:
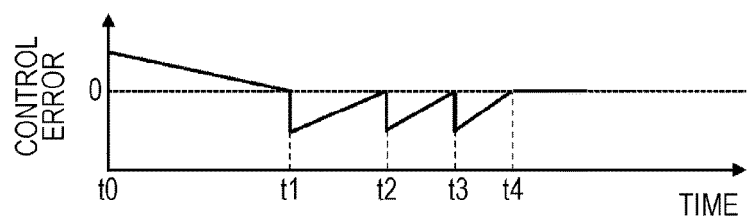
FIG. 18A is a diagram illustrating the relationship between time and control error in the search control in FIG. 17.
Figure 18B:
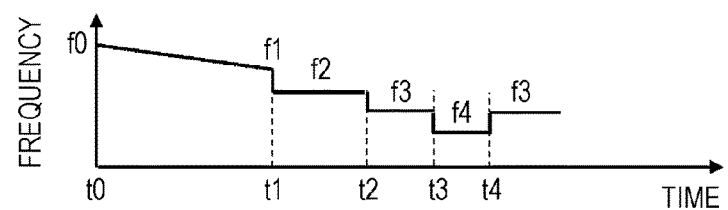
FIG. 18B is a diagram illustrating the relationship between time and frequency in the search control in FIG. 17.
Figure 18C:
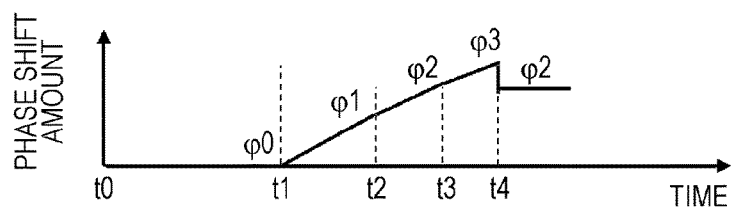
FIG. 18C is a diagram illustrating the relationship between time and phase shift amount in the search control in FIG. 17.
Figure 18D:
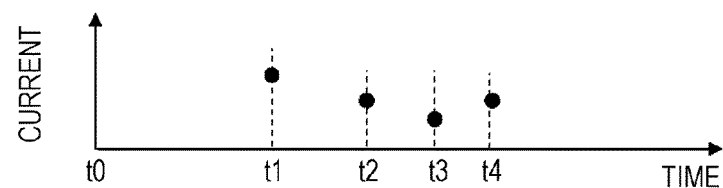
FIG. 18D is a diagram illustrating the relationship between time and current in the search control in FIG. 17.

FIG. 17 is a schematic diagram illustrating an example of search control in the present embodiment. FIG. 18A is a diagram illustrating change over time of error indicated by the control error information when having performed the search control in FIG. 17. In the same way, FIG. 18B is a diagram illustrating change over time of frequency when having performed the search control. FIG. 18C is a diagram illustrating change over time of phase shift amount when having performed the search control. FIG. 18D is a diagram illustrating change over time of current detected by the input detection circuit 1002 when the control error is sufficiently near 0.

In this example, first, when starting control at point-in-time t0 with the initial frequency f0 and initial phase shift amount φ0, the received voltage is lower than the target voltage as illustrated in FIG. 17, so the control error exhibits a positive value. The frequency is then changed so that the control error is closer to 0. In this example, the lower the frequency is the further the received voltage increases, so the frequency is reduced from f0 to f1 so that the control error is brought closer to 0. This processing corresponds to the above-described preparatory steps S401 through S403. Once the control error becomes 0 at point-in-time t1, and the received voltage has been adjusted to the target voltage, the efficiency search step is started, and the frequency is changed from f1 to f2. The received voltage deviates from the target voltage due to change in the frequency, which is compensated for by changing the phase shift amount from φ0 to φ1, so that the received voltage and the target voltage agree again. As a result of repeating these operations, determination is made that the current is the smallest and transmission efficiency is the highest at frequency f3. In this case, transmission is continued at frequency f3 from point-in-time t4 and thereafter.

In the present embodiment, the pulse shift value when starting output adjustment at the time of changing the frequency is not returned to φ0, rather, the phase shift amount from when the control error was within the predetermined range at the previous frequency continues to be held. Accordingly, deviation as to the target voltage which the power receiving side requires can be suppressed when changing frequency.

The control method is not restricted to the above example, and a method illustrated in FIGS. 19A through 19D may be employed. FIGS. 19A through 19D illustrate an example of control in a method where, at the time of changing frequency, output adjustment is started from a phase shift amount predicted from the previous value and a value from two times back, as illustrated in FIG. 20.

Figure 19A:
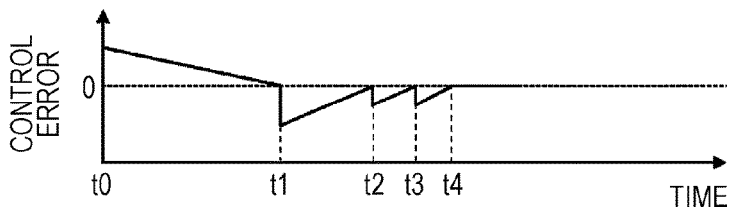
FIG. 19A is a diagram illustrating passage of time of control error information in search control different from that in FIG. 17.
Figure 19B:
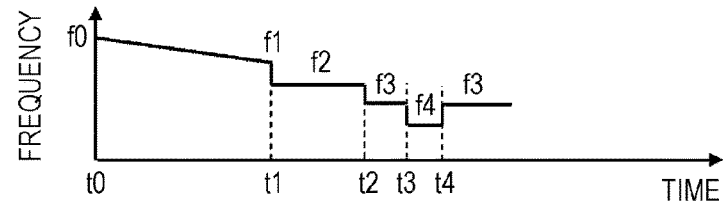
FIG. 19B is a diagram illustrating passage of time of controlled frequency in search control different from that in FIG. 17.
Figure 19C:
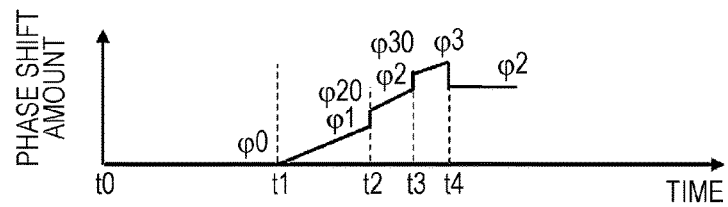
FIG. 19C is a diagram illustrating passage of time of controlled phase shift amount in search control different from that in FIG. 17.
Figure 19D:
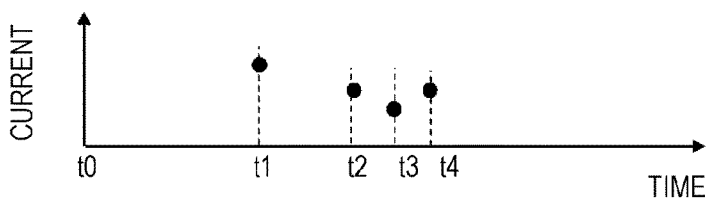
FIG. 19D is a diagram illustrating current over time detected by an input detection circuit when the control error is sufficiently near 0, in search control different from that in FIG. 17.

FIG. 19A is a diagram illustrating change over time of control error information. In the same way, FIG. 19B is a diagram illustrating change over time of frequency when controlled. FIG. 19C is a diagram illustrating change over time of phase shift amount when controlled. FIG. 19D is a diagram illustrating change over time of current detected by the input detection circuit 1002 when the control error is sufficiently near 0.

Figure 20:
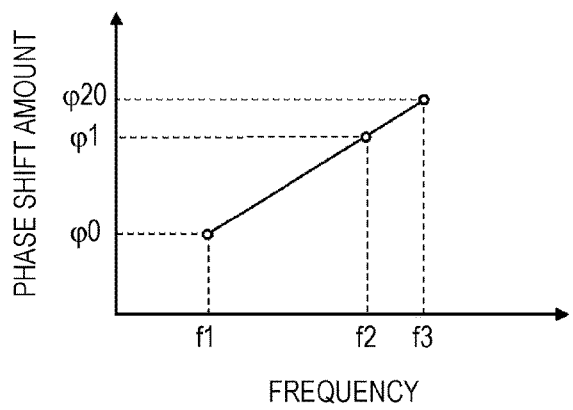
FIG. 20 is a diagram illustrating an example of control in a method where output adjustment is started from a phase shift amount that has been predicted from a value one time before and a value two times before.

In a case where the phase shift amount where the control error is 0 when the frequency is f1 at point-in-time t1 is φ0, and the phase shift amount where the control error is 0 when the frequency is f2 at point-in-time t2 is φ1, the phase shift amount φ20 can be predicted for changing the frequency to f3 by the following Expression 2, as illustrated in FIG. 20.

$$\varphi 20=(\varphi 1-\varphi 0)*(f3-f1)/(f2-f1)+\varphi 0 \quad \text{(Expression 2)}$$

Accordingly, in the example illustrated in FIG. 19C, output adjustment at frequency f3 controlled to start from the state of phase shift amount φ20. At the time of changing the frequency to 4f at point-in-time t3 as well, a phase shift amount of φ30 can be predicted based on a similar expression. According to this control, the amount of time required for output voltage adjustment can be reduced as compared to the control illustrated in FIGS. 17 through 18D, and quicker control can be realized.

Note that the above expression is only a simple example, and the initial values φ20, φ30, and so forth, may be obtained for the phase shift amount by other methods as well. For example, a prediction value for the phase shift amount may be calculated taking into consideration the phase shift amount from before two times back. In such prediction control, at the time of changing the frequency, the control circuitry 1009 desirably obtains a prediction value for the phase shift amount based on the phase shift amount from at least the previous time and two times back, and executes the operations of steps S502 through S504 with this prediction value as the initial value.

While the determination in step S505 has been described using current at the power transmission side in the present embodiment, the current could serve as a determination standard since the DC source 1030 was a constant voltage source. That is to say, if the DC source 1030 is a constant current source, voltage may be used as the determination standard. Also, determination in step S505 may be performed based on power consumption at the power transmission side. In this case, the input detection circuit desirably detects both current and voltage within the power transmission device, and calculates the consumed power. In cases where the output voltage of the DC source 1030 drops if the load is large, precision can be improved by using power itself as the determination standard.

Also, the received voltage/frequency properties illustrated in FIG. 17 are an assumption in the above description, so the received voltage is brought close to being constant while changing from higher frequency toward lower frequency, but this control is not restrictive. The frequency and output time ratio may be controlled by a method suitable for the received voltage/frequency properties of the system.

According to the present embodiment, information of power itself from the power receiving side is not necessary, the frequency with the highest efficiency being searched from the control error information. The Qi standard, which is an international standard for wireless power supply, formulated by the Wireless Power Consortium (WPC), stipulates power information at the power receiving side besides control error information, as information fed back from the power receiving device in a wireless power transmission system. The Qi standard stipulates the transmission frequency of power information fed back from the power receiving device at 1500 msec, and the transmission frequency of control error information at 250 msec. Accordingly, in a case of calculating the transmission efficiency from the power information of the power receiving side and the power information detected at the power transmission side, and searching for a frequency where the transmission efficiency is highest, the amount of time required to find the optimal frequency is longer. The present embodiment uses control error information, so the optimal frequency can be searched even faster.

Also, the control according to the present embodiment is of a method that searches for conditions where the current consumption at the power transmission side is smallest upon the receiving circuit 1103 having received control error information within a predetermined range. Accordingly, the only necessary information is control error information calculated from the voltage at the power receiving side and so forth, and current at the power transmission side and so forth. Thus, the amount of information necessary is small as compared to a case of directly calculating transmission efficiency (information of current and voltage at the power transmission side and information of current and voltage at the power receiving side are necessary), so the load of control can be reduced.

Control Method 4

Figure 21:
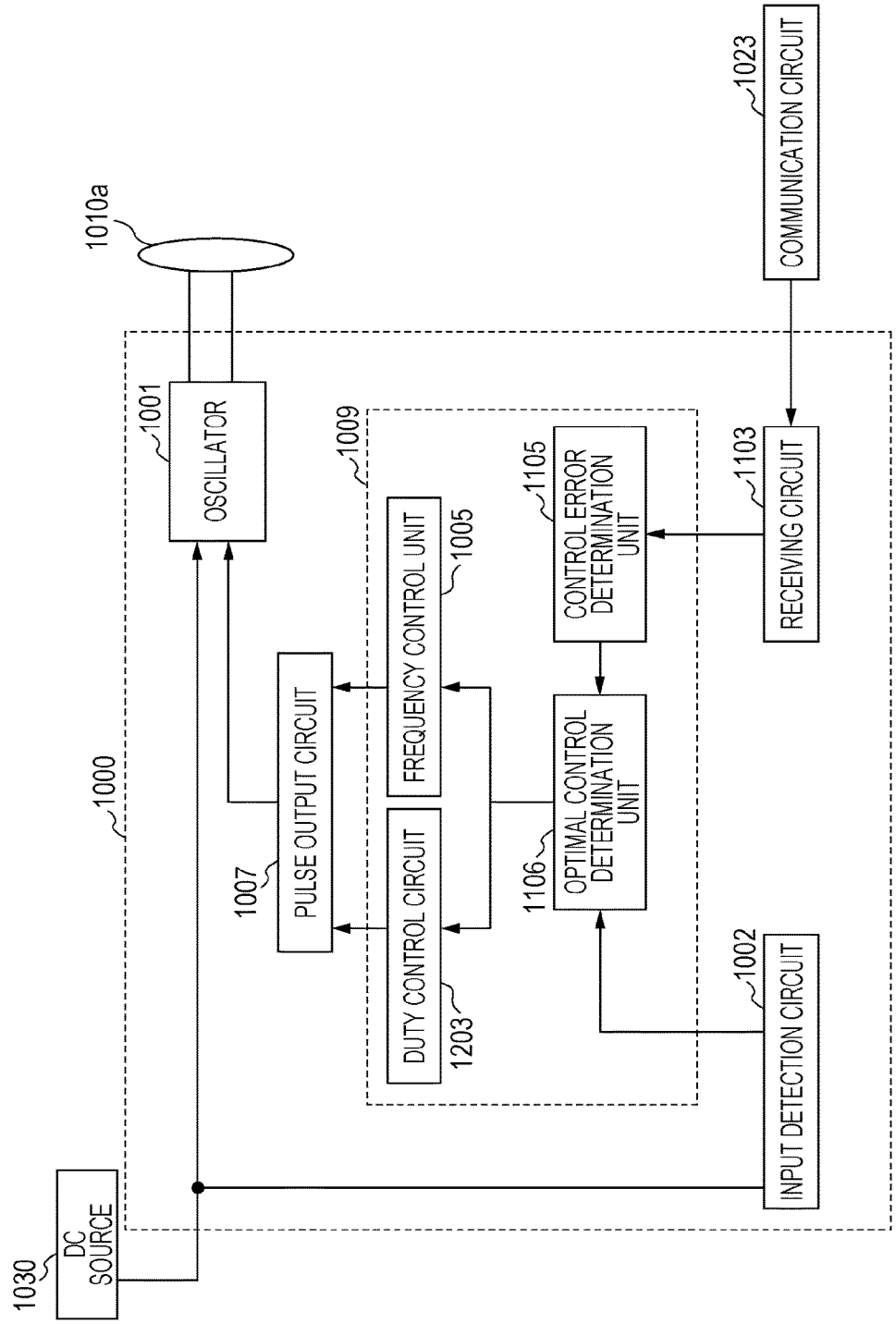
FIG. 21 is a diagram illustrating a fourth example of a control method in the second embodiment.

Next, a fourth example of the control method according to the present embodiment will be described. FIG. 21 is a block diagram illustrating a functional configuration of the power transmission device 1000 according to a control method 4. Components which are in common with FIGS. 2B and 13 are denoted by the same reference numerals. The power transmission device 1000 according to the control method 4 has a duty control unit 1203 that controls the duty cycle of pulses, instead of the phase control unit 1003, and is the same as the above-described control method 3 other than this point. Accordingly, description will be made primarily regarding points of difference from the above-described control method 3.

Figure 22A:
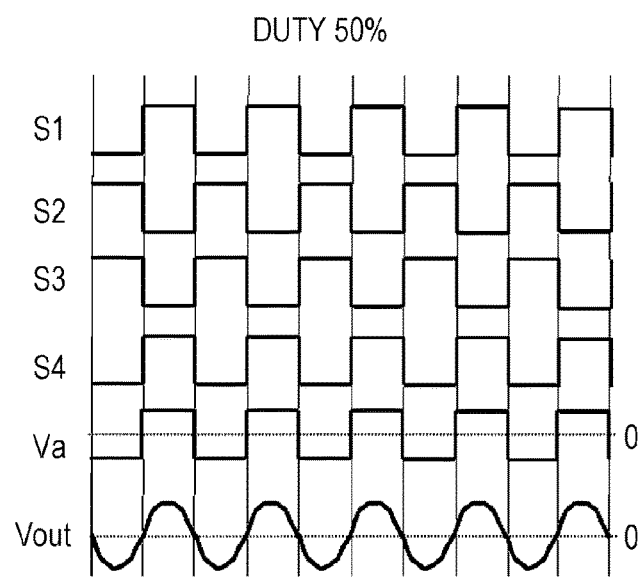
FIG. 22A is a diagram illustrating signals applied to each of four switching devices, in a case of a duty cycle of 50%.
Figure 22B:
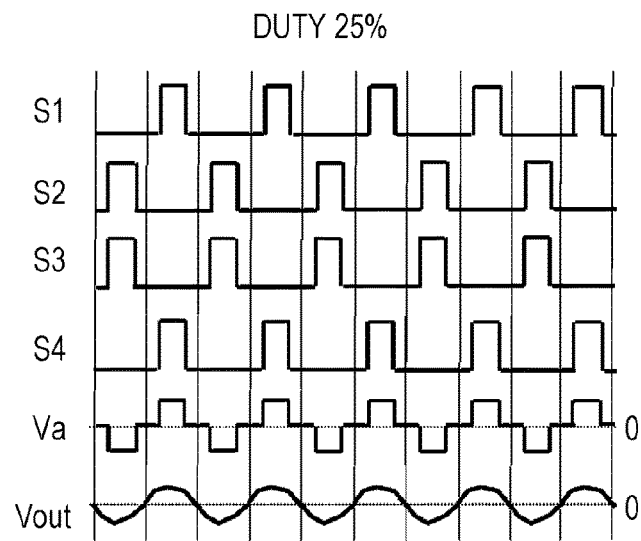
FIG. 22B is a diagram illustrating signals applied to each of four switching devices, in a case of a duty cycle of 25%.

In the control method 4, the control circuitry 1009 adjusts the output time ratio by changing the duty cycle of pulses input to the switching devices. FIGS. 22A and 22B are diagrams illustrating example of pulse waves input to the oscillator. FIG. 22A is a diagram illustrating an example of the waveforms of pulse voltage applied to each of switching devices S1 through S4, voltage Va output from the oscillator 1001, and voltage Vout obtained by converting voltage Va into sine waves, in a case of a duty cycle of 50%. FIG. 22B is a diagram illustrating an example of the waveforms of these voltages in a case of a duty cycle of 25%. As can be seen from these drawings, the output time ratio of the output AC voltage Va and the amplitude of the sine wave voltage Vout can be reduced by shifting the duty cycle from 50%. In other words, the greatest output can be obtained when the duty cycle is 50%, and output adjustment can be performed by lowering the duty cycle to an optional value smaller than 50%.

The control flow in the control method 4 is the same as the control flow in the control method 3 described above, except for the point that the part relating to phase control is replaced by duty control by the duty control unit 1203. Accordingly, description of detailed operations will be omitted.

Although the oscillator 1001 illustrated in FIG. 2B is a full-bridge configuration circuit having four switching devices, a half-bridge configuration circuit having two switching devices, such as illustrated in FIG. 12, may be used in the present embodiment. This enables high efficiency and stable operation according to the present embodiment to be realized with a simpler configuration.

Control Method 5

Figure 23:
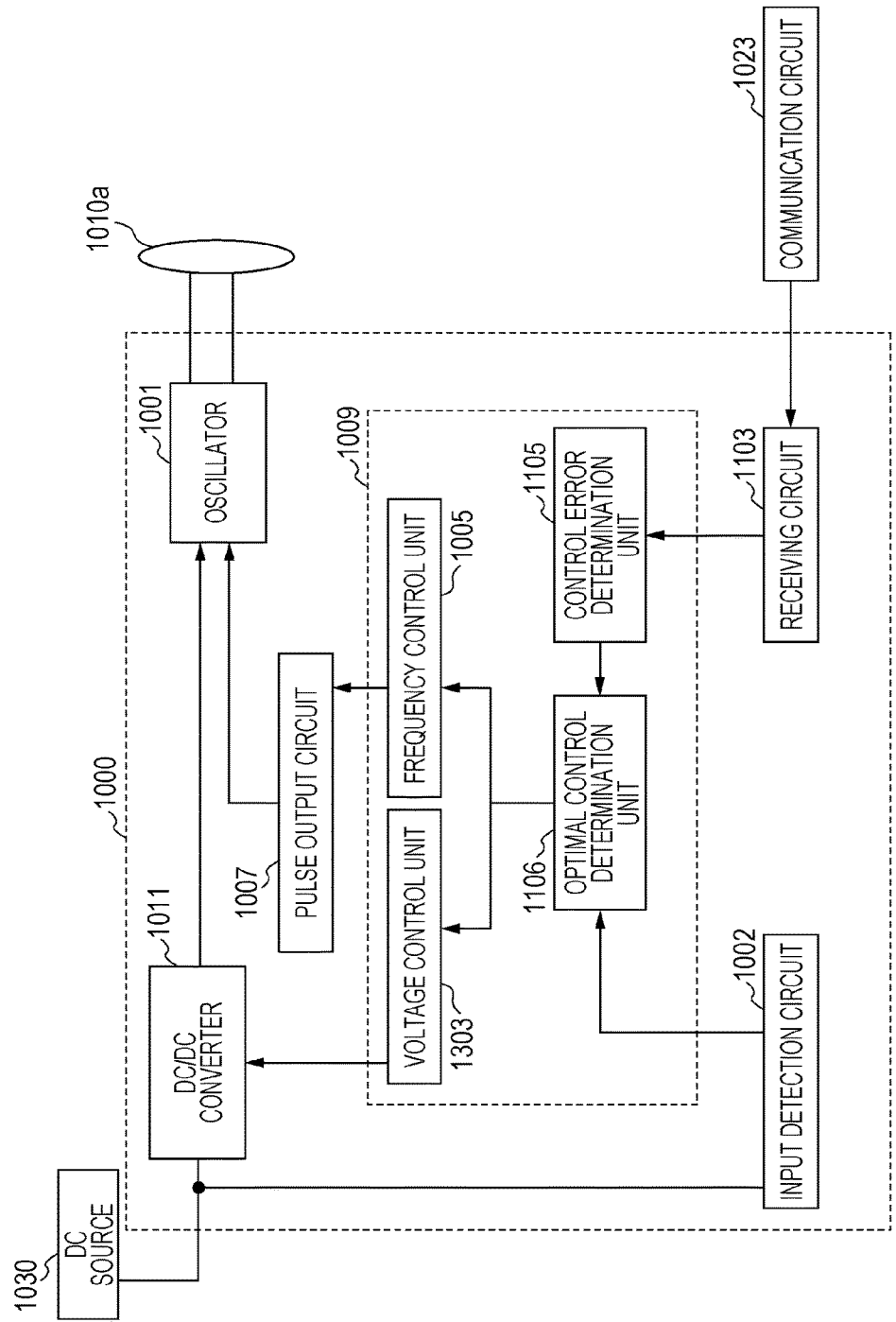
FIG. 23 is a diagram illustrating a fifth example of a control method in the second embodiment.

Next, a fifth example of the control method according to the present embodiment will be described. FIG. 23 is a block diagram illustrating a functional configuration of the power transmission device 1000. Components which are in common with FIGS. 2B and 13 are denoted by the same reference numerals. A DC/DC converter 1011 is connected between the DC source 1030 and the oscillator 1001 in the present embodiment. This also differs from the first embodiment and second embodiment with regard to the point that the control circuitry 1009 has a voltage control unit 1303 instead of the phase control unit 1003 or duty control unit 1203. The voltage control unit 1303 is configured to control the output voltage of the DC/DC converter 1011. Other components are in common with the first embodiment and the second embodiment. In the control method 5, the pulse output circuit 1007 and DC/DC converter 1011 make up an adjustment circuit that adjusts the frequency and amplitude of voltage output from the oscillator 1001.

Also, in the control method 5, the pulses input to the switching devices of the oscillator 1001 are fixed at a predetermined phase shift amount and duty cycle, and the amplitude of the voltage output from the oscillator 1001 is adjusted by changing the DC voltage to be supplied to the oscillator 1001 by the DC/DC converter 1011. A known configuration may be employed for the DC/DC converter 1011, such as a non-insulated converter using a choke coil, an insulated converter using a transformer, or the like. The voltage control unit 1303 within the control circuitry 1009 can change the output voltage of the DC/DC converter 1011 by a method such as adjusting the input timing of pulses to the switching devices included in the oscillator 1001.

The control flow in the control method 5 is the same as the control flow in the first embodiment, except for the point that the part relating to phase control is replaced by control by the DC/DC converter 1011 to change output voltage. Accordingly, description of detailed operations will be omitted. Also, an oscillator 1001 having a half-bridge configuration circuit, such as illustrated in FIG. 12, may also be used in the control method 5, in the same way as in the second embodiment. This enables high efficiency and stable operation according to the present embodiment to be realized with a simpler configuration than a full-bridge configuration.

The first and second embodiments have been described as examples of the technology of the present disclosure. It should be noted, however, that the technology according to the present disclosure is not restricted to these, and can be applied to embodiments where modifications, replacements, additions, omissions, and so forth, have been performed as appropriate. Further, the components described above in the first and second embodiments may be combined to form new embodiments. Examples of other embodiments will be illustrated below.

While operations illustrated in FIG. 15 have been described regarding the third control method example, this is but one example. The preparatory steps (S401 through S403) may be omitted, and just the efficiency search step (S501 through S507) executed, as described above. It is sufficient that the control circuitry be configured so as to execute the first operation of changing the output time ratio or amplitude of voltage output from the oscillator by a predetermined amount, so that the error indicated by the control error information comes within the predetermined range, and the second operation of changing the frequency of voltage output from the oscillator by a predetermined amount, so that the value indicated by the detection results of the input detection circuit approaches the minimal value.

Although the above embodiments assume the power receiving device 1020 including the rectifier circuit 1021 and supplying DC energy to the load 1040, the technology according to the present disclosure is not restricted to such a configuration. Configurations where the power receiving device 1020 does not have the rectifier circuit 1021 are conceivable in usages where energy is wirelessly supplied to an AC load, such as an AC electric motor. In this case, any one of the controls described above may be performed with information, indicating the difference between actual values and predetermined target values of voltage applied to the load 1040 or current flowing through the load, as the control error information.

Power Transmission Device According to First Aspect of Present Disclosure

A power transmission device according to a first aspect of the present disclosure includes:

an oscillator that has a first switching device connected to a high-voltage side of DC power supplied from a DC source and a second switching device connected to a low-voltage side of the DC power, the oscillator outputting AC power converted from the DC power via a first output end connected to the first switching device and a second output end connected to the second switching device;

a power transmission antenna that transmits the AC power output from the oscillator, for output to a load of a power receiving device;

memory that holds a predetermined value indicating at least one of required voltage, required current, and required power, of the power receiving device;

a receiving circuit that receives information of at least one of voltage, current, and power supplied to the load of the power receiving device; and a control circuitry that changes an output time ratio of voltage of the AC power output from the oscillator, by using the first switching device and the second switching device to change times at which voltage at the first output end of the oscillator and voltage at the second output end are to be of the same potential, changes a frequency of voltage of the AC power output from the oscillator and determines a frequency of AC power where efficiency of the AC power is greatest, and converges at least one of the voltage, current, and power, of which information has been received, to a range of the predetermined value, and outputs AC power of which the efficiency is greatest to the load.

According to the above aspect, the power transmission device changes the frequency of voltage of the AC power output from the oscillator and determines a frequency where efficiency of the AC power is greatest. The power transmission device does not just adjust the frequency of the voltage of the AC power, but changes the output time ratio of the voltage of the AC power output from the power transmission device oscillator.

That is to say, in the power transmission device, even if at least one of the voltage, current, and power, regarding which information has been received, is made to converge in a range of a stipulated value representing at least one of required voltage, required current, and required power of the power receiving device, AC power with greatest efficiency is not realized.

On the other hand, even if the power transmission device outputs AC power with greatest efficiency to the power receiving device, at least one of the voltage, current, and power, of which information has been received from the power receiving device, will fall outside of a range of a stipulated value representing at least one of required voltage, required current, and required power, of the power receiving device.

According to this aspect, the output time ratio of voltage of the AC power output from the power transmission device oscillator is changed, so that at least one of the voltage, current, and power, of which information the power transmission device has received from the power receiving device, is made to converge in a range of a stipulated value, while deciding a frequency for AC power where efficiency is greatest.

Accordingly, even in a case where the frequency of the voltage of the AC power output from the power transmission device and the frequency of voltage of the AC power received by the power receiving device do not match, at least one of the voltage, current, and power, of which information the power transmission device has received from the power receiving device, is made to converge in a range of a stipulated value, so the efficiency of the AC power received at the power receiving device can be maximized.

In the above aspect, for example, the receiving circuit may receive the predetermined value indicating at least one of the required voltage, the required current, and the required power, from the power receiving device, and the control circuitry may store the received predetermined value in the memory.

In the above aspect, for example, the control circuitry changes a frequency of AC power output from the oscillator from high-frequency waves to low-frequency waves, and determines a frequency of the AC power where the efficiency of the AC power is greatest.

According to the above aspect, the voltage supplied to the load of the power receiving device can be gradually raised by changing the frequency of the voltage of the AC power from high-frequency waves to low-frequency waves. As a result, instantaneous high voltage can be prevented, and damage to the internal circuits of the power receiving device can be avoided.

In the above aspect, for example, an output time ratio of voltage of the AC power output from the oscillator may be changed, at the frequency of the AC power where the AC power with greatest efficiency has been determined.

According to the above aspect, the output time ratio of voltage of the AC power output from the oscillator is changed after the frequency of the AC power where the efficiency is greatest has been determined, is the process of changing the output time ratio of the voltage of the AC power can be ended at one time. As a result, AC power with the greatest efficiency can be output to the load while satisfying the predetermined value of the required value in a short time.

In the above aspect, for example, the control circuitry may change the output time ratio of the voltage of the AC power and converge the voltage supplied to the load to the predetermined value, and thereafter change the frequency of the voltage of the AC power and determine a frequency of the AC power where the efficiency of the AC power is greatest.

According to the above aspect, first, the power transmission device converges at least one of the voltage, current, and power, of which information has been received from the power receiving device, to the range of the predetermined value. Thereafter, the frequency of the voltage of the AC power is changed, and a frequency of the AC power where the efficiency of the AC power is greatest is searched for. Accordingly, the frequency of the voltage of the AC current is changed near the range of the predetermined value, so for example, adverse effects such as damage to the internal circuits of the power receiving device can be reduced.

In the above aspect, for example, the receiving circuit may receive, from the power receiving device, error information indicating an error between at least one of voltage, current, and power of the AC power output to the load, and the predetermined value, and the control circuitry may use the error which the error information indicates to converge at least one of the voltage, current, and power, of which information has been received, to the range of the predetermined value.

According to the above aspect, error between at least one of voltage, current, and power of the AC power output to the load, and the predetermined value, is calculated at the power receiving device. Accordingly, the power transmission device can use the error which the received error information indicates even without calculating the error, to converge at least one of the voltage, current, and power, of which information has been received, to the range of the predetermined value, thereby reducing the calculation load at the power transmission device side.

In the above aspect, for example, the oscillator may be an oscillator of which the first output end and the second output end are connected to the power transmission antenna, and that includes four switching devices, of two first switching devices connected to the high-voltage side of the DC power and two second switching devices connected to the low-voltage side, and that changes a conducting state of the switching devices in accordance with pulses supplied from the control circuitry, thereby converting the DC energy into the AC energy, where the four switching devices are configured as a switching device pair including the first switching device and the second switching device that output voltage of a same polarity as the DC power when conducting, and a switching device pair including the first switching device and the second switching device that output voltage of an inverse polarity from the DC power when conducting, the a phase difference of the pulses supplied from the control circuitry to the two first switching devices and second switching devices of the switching device pairs being changed, and the output time ratio of voltage of the AC power output from the oscillator being changed.

According to the above aspect, there are fewer cases where the first switching devices and the second switching devices are turned off at the same time as compared to duty control, so power with less noise can be supplied to the power receiving device. Note that the above aspect may be realized as a wireless power transmission system.

Power Transmission Device According to Second Aspect of Present Disclosure

A power transmission device according to a second aspect of the present disclosure includes:
- an oscillator that has a first switching device connected to a high-voltage side of DC power supplied from a DC source and a second switching device connected to a low-voltage side of the DC power, the oscillator outputting AC power converted from the DC power via a first output end connected to the first switching device and a second output end connected to the second switching device;
- an input detection circuit that detects a current value of DC power supplied from the DC source to the oscillator;
- a power transmission antenna that transmits the AC power output from the oscillator, for output to a load of a power receiving device;
- memory that holds a predetermined value indicating at least one of required voltage, required current, and required power, of the power receiving device;
- a receiving circuit that continuously receives information of at either one of voltage and current supplied to the load of the power receiving device; and
- a control circuitry that
  - changes an output time ratio of voltage of the AC power output from the oscillator, by using the first switching device and the second switching device to change times at which voltage at the first output end of the oscillator and voltage at the second output end are to be of the same potential, converges the continuously received one of the voltage and current, to a range of the predetermined value, and determines a frequency of the AC power where the current value of the DC current supplied from the DC source to the oscillator is smallest, and
  - outputs AC power, having efficiency corresponding to a value obtained by dividing the required power by an AC power where the current value of the DC power is the smallest, to the load as AC power of which the efficiency is greatest.

According to the above aspect, the frequency of the AC power where the efficiency of the AC power is greatest is not determined, but rather the frequency of the AC power where the current value detected by the input detection circuit is smallest is determined.

That is to say, in a case where the current value of the DC power supplied from the DC source to the oscillator is smallest, the efficiency of the AC power output from the oscillator is greatest. Accordingly, a predetermined value indicating at least one of required voltage, required current, and required power, which the load of the power receiving device requires, is received once, and these are held in memory of the power transmission device. The required power is easily calculated from the required voltage and required current. The output time ratio of the voltage of the AC power is changed, and the frequency of the AC power where the current value of the DC power is smallest is determined while converging either one of the continuously received voltage or current to the range of the predetermined value. A value obtained by dividing the required power by the AC power where the current value of the DC power is smallest is the efficiency, so the value where the current value of the DC power is smallest is the greatest efficiency point of the AC power. Thus, the efficiency of the AC power output from the oscillator can be maximized in a relatively short period.

In the above aspect, for example, the oscillator may be an oscillator of which the first output end and the second output end are connected to the power transmission antenna, and that includes four switching devices, of two first switching devices connected to the high-voltage side of the DC power and two second switching devices connected to the low-voltage side of the DC power, and that changes a conducting state of the switching devices in accordance with pulses supplied from the control circuitry, thereby converting the DC energy into the AC energy, where the four switching devices are configured as a switching device pair including the first switching device and the second switching device that output voltage of a same polarity as the DC power when conducting, and a switching device pair including the first switching device and the second switching device that output voltage of an inverse polarity from the DC power when conducting, the a phase difference of the pulses supplied from the control circuitry to the two first switching devices and second switching devices of the switching device pairs being changed, and the output time ratio of voltage of the AC power output from the oscillator being changed.

According to the above aspect, there are fewer cases where the first switching devices and the second switching devices are turned off at the same time as compared to duty control, so power with less noise can be supplied to the power receiving device. Note that the above aspect may be realized as a wireless power transmission system.

Power Transmission Device According to Third Aspect of Present Disclosure

A power transmission device according to a third aspect of the present disclosure includes:
- an oscillator that outputs AC power converted from DC power supplied from a DC source via a first output end connected to a first switching device and a second output end connected to a second switching device;
- a power transmission antenna that transmits the AC power output from the oscillator, for output to a load of a power receiving device;
- memory that holds a predetermined value indicating at least one of required voltage, required current, and required power, of the power receiving device;
- a receiving circuit that receives information of at least one of voltage, current, and power supplied to the load of the power receiving device; and
- a control circuitry that
  - changes an output time ratio of voltage of the AC power output from the oscillator, by using the first switching device and the second switching device to change times at which voltage at the first output end of the oscillator and voltage at the second output end are to be of the same potential,
  - changes a frequency of voltage of the AC power output from the oscillator and determines a frequency of AC power where efficiency of the AC power is greatest, and
  - converges at least one of the voltage, current, and power, of which information has been received, to a range of the predetermined value, and outputs AC power of which the efficiency is greatest to the load.

According to the above aspect, the output time ratio of voltage of the AC power output from the power transmission device oscillator is changed, so that at least one of the voltage, current, and power, of which information the power transmission device has received from the power receiving device, is made to converge in a range of a stipulated value, while deciding a frequency for AC power where efficiency is greatest.

Accordingly, even in a case where the frequency of the voltage of the AC power output from the power transmission device and the frequency of voltage of the AC power received by the power receiving device do not match, at least one of voltage, current, and power, of which information the power transmission device has received from the power receiving device, is made to converge in a range of a stipulated value, so the efficiency of the AC power received at the power receiving device can be maximized.

Program According to Fourth Aspect of Present Disclosure

A program according to a fourth aspect of the present disclosure is a program executed in a power transmission device including an oscillator that outputs AC power converted from DC power supplied from a DC source via a first output end connected to a first switching device and a second output end connected to a second switching device, a power transmission antenna that transmits the AC power output from the oscillator, for output to a load of a power receiving device, memory that holds a predetermined value indicating at least one of required voltage, required current, and required power, of the power receiving device, and a receiving circuit that receives at least one of information of voltage, current, and power supplied to the load of the power receiving device;

the program causing a computer of the power transmission device to execute processing to change an output time ratio of voltage of the AC power output from the oscillator, by using the first switching device and the second switching device to change times at which voltage at the first output end of the oscillator and voltage at the second output end are to be of the same potential, processing to change a frequency of voltage of the AC power output from the oscillator and determine a frequency of AC power where efficiency of the AC power is greatest, and processing to converge at least one of the voltage, current, and power, of which information has been received, to a range of the predetermined value, and output AC power of which the efficiency is greatest to the load.

According to the above aspect, the output time ratio of voltage of the AC power output from the power transmission device oscillator is changed, so that at least one of the voltage, current, and power, of which information the power transmission device has received from the power receiving device, is made to converge in a range of a stipulated value, while deciding a frequency for AC power where efficiency is greatest.

Accordingly, even in a case where the frequency of the voltage of the AC power output from the power transmission device and the frequency of voltage of the AC power received by the power receiving device do not match, at least one of the voltage, current, and power, of which information the power transmission device has received from the power receiving device, is made to converge in a range of a stipulated value, so the efficiency of the AC power received at the power receiving device can be maximized.

The above aspect may be realized as a recording medium readable by the computer, in which is recorded the program for causing the computer of the power transmission device to execute.

Wireless Power Transmission System Having Power Transmission Device According to Fifth Aspect of Present Disclosure A wireless power transmission system according to a fifth aspect of the present disclosure includes:

a power transmission circuit that converts input DC energy into AC energy and outputs;

a power transmission antenna that transmits the AC energy output from the power transmission circuit;

a power receiving antenna that receives at least part of the AC energy transmitted by the power transmission antenna; and a power receiving circuit that converts the AC energy received by the power receiving antenna into DC energy and supplies to a load, the power receiving circuit including an output detection circuit that detects voltage and current output to the load, and a communication circuit that conveys detection results by the output detection circuit to the power transmission circuit, the power transmission circuit including an input detection circuit that detects input DC voltage and DC current, an oscillator that includes a plurality of switching devices of which the conduction state is changed in accordance with input pulses, where the DC energy is converted into the AC energy by causing change in the conduction states of the switching devices, a pulse output circuit that generates the pulses and outputs to the switching devices, and a control circuitry that controls the pulse output circuit so that the frequency and output time ratio of voltage output from the oscillator are each a frequency and output time ratio determined based on the detection results of the output detection circuit conveyed from the communication circuit and the detection results of the input detection circuit.

In the above aspect, the control circuitry may, for example, change the frequency so that transmission efficiency becomes closer to maximal, based on the detection results of the output detection circuit and the input detection circuit.

In the above aspect, the control circuitry may, for example, change the output time ratio of the voltage output from the oscillator, so that voltage supplied from the power receiving circuit to the load becomes closer to a predetermined value, based on the detection results of the output detection circuit and the input detection circuit.

In the above aspect, the control circuitry may, for example, change the output time ratio of the voltage output from the oscillator by instructing the pulse output circuit to change a duty cycle of the pulses input to the switching devices.

In the above aspect, the plurality of switching devices may, for example, be configured including a switching device that outputs voltage of the same polarity as the input voltage when conducting, and a switching device that outputs voltage of an inverse polarity from the input voltage when conducting.

In the above aspect, the plurality of switching devices may, for example, be configured including a switching device pair that outputs voltage of the same polarity as the input voltage when conducting, and a switching device pair that outputs voltage of an inverse polarity from the input voltage when conducting.

Wireless Power Transmission System Having Power Transmission Device According to Sixth Aspect of Present Disclosure A wireless power transmission system according to a sixth aspect of the present disclosure includes:
- a power transmission circuit that converts input DC energy into AC energy and outputs;
- a power transmission antenna that transmits the AC energy output from the power transmission circuit;
- a power receiving antenna that receives at least part of the AC energy transmitted by the power transmission antenna; and
- a power receiving circuit that converts the AC energy received by the power receiving antenna into DC energy and supplies to a load,
- the power receiving circuit including
  - an output detection circuit that detects voltage and current output to the load, and
  - a communication circuit that conveys detection results by the output detection circuit to the power transmission circuit,
- the power transmission circuit including
  - an input detection circuit that detects input DC voltage and DC current,
  - an oscillator that includes four switching devices of which the conduction state is changed in accordance with input pulses, where the DC energy is converted into the AC energy by causing change in the conduction states of the switching devices, the four switching devices being configured including a switching device pair that outputs voltage of the same polarity as the input voltage when conducting, and a switching device pair that outputs voltage of an inverse polarity from the input voltage when conducting,
  - a pulse output circuit that generates the pulses and outputs to the switching devices, and
  - a control circuitry that, based on the detection results of the output detection circuit conveyed from the communication circuit and the detection results of the input detection circuit, determines a frequency of the pulses to be input to each of the plurality of switching devices, and phase difference between two pulses to be input to two switching devices making up each switching device pair, and controls the pulse output circuit to output pulses to the switching devices corresponding to the determined frequency and phase difference.

According to the above aspect, the control circuitry may change the frequency so that the transmission efficiency becomes closer to maximal, based on the detection results of the output detection circuit and the input detection circuit.

In the above aspect, the control circuitry may, for example, change the phase difference between the two pulses input to the two switching devices making up each switching device pair, so that voltage supplied from the power receiving circuit to the load becomes closer to a predetermined value, based on the detection results of the output detection circuit and the input detection circuit.

According to the above aspect, the control circuitry may adjust the frequency so that the transmission efficiency becomes closer to maximal, while adjusting the phase difference so that the voltage supplied to the load is maintained at the predetermined value.

According to the above aspect, the control circuitry may, after having performed control so that the transmission efficiency becomes closer to maximal, perform control so that the output voltage becomes closer to the predetermined value.

According to the above aspect, the control circuitry may, at the time of starting transmission, set the phase difference to a value determined beforehand, and thereupon perform control to adjust the frequency.

According to the above aspect, $0.1<k<0.5$ may be satisfied, where k is a coupling coefficient of the power transmission antenna and power receiving antenna.

According to the above aspect, the load may be a secondary battery, with the power receiving antenna and power receiving circuit installed in an electronic device having the secondary battery.

Note that the above aspect may be realized as a power transmission device of a wireless power transmission system.

Wireless Power Transmission System Having Power Transmission Device According to Seventh Aspect of Present Disclosure A wireless power transmission system according to a seventh aspect of the present disclosure includes:
- a power transmission circuit that converts input DC energy into AC energy and outputs;
- a power transmission antenna that transmits the AC energy output from the power transmission circuit;
- a power receiving antenna that receives at least part of the AC energy transmitted by the power transmission antenna; and
- a power receiving circuit that converts the AC energy received by the power receiving antenna into DC energy and supplies to a load,
- the power receiving circuit including
  - an output detection circuit that detects at least one of voltage applied to the load and current flowing through the load,
  - an error calculation circuit that calculates control error information indicating error between a value indicated by detection results from the output detection circuit and a target value set beforehand,
  - a transmission circuit that conveys the control error information to the power transmission circuit,
- the power transmission circuit including
  - an input detection circuit that detects at least one of voltage and current input to the power transmission circuit,
  - an oscillator that converts input DC energy into AC energy and outputs,
  - an adjusting circuit that adjusts frequency of voltage output from the oscillator, and output time ratio or amplitude of the voltage,
  - a receiving circuit that receives the control error information transmitted from the transmission circuit, and
  - a control circuitry that controls the adjusting circuit so that the frequency of voltage output from the oscillator and output time ratio or amplitude of the voltage each become a frequency and output time ratio or amplitude determined based on the control error information and detection results of the input detection circuit.

According to the above aspect, the control circuitry may execute a the first operation of changing the output time ratio or amplitude of voltage output from the oscillator by a predetermined amount, so that the error indicated by the control error information comes within a predetermined range, and a second operation of changing the frequency of voltage by a predetermined amount, so that the value indicated by the detection results of the input detection circuit approaches the minimal value.

According to the above aspect, the control circuitry may, after executing the first operation, execute the second operation in a case where a value indicating the detection results of the input detection circuit has not reached a minimal value yet, and after executing the second operation, acquire the control error information again, and if the error indicated by the acquired control error information is not within the predetermined range, re-execute the first operation.

According to the above aspect, the oscillator may include a plurality of switching devices of which the conduction state is changed in accordance with input pulses, configured such that the DC energy is converted into the AC energy by causing change in the conduction states of the switching devices, the adjusting circuit may include a pulse output circuit that outputs the pulses to the switching devices of the oscillator, and the control circuitry may change the frequency of the voltage output from the oscillator by changing the frequency of the pulses output from the pulse output circuit.

According to the above aspect, the plurality of switching devices may include a switching device pair that outputs voltage of a same polarity as the input voltage when conducting, and a switching device pair that outputs voltage of an inverse polarity from the input voltage when conducting, and the control circuitry may control the frequency and output time ratio of the voltage output from the oscillator by deciding a frequency of pulses to be input to each of the multiple switching devices and a phase shift amount between two pulses to be input to two switching devices making up each switching device pair, based on the control error information and detection results of the input detection circuit, and instruct the pulse output circuit so as to output pulses corresponding to the determined frequency and phase shift amount to the switching devices.

According to the above aspect, the control circuitry may repeat a first operation where the phase shift amount is changed by a predetermined value so that the control error information comes within a predetermined range, and after completing the first operation, a second operation of changing the frequency by a predetermined value so that a value indicated by the detection results of the input detection circuit comes close to a minimal value.

According to the above aspect, after having executed the second operation, the control circuitry may re-acquire the control error information without changing the phase shift amount, and in a case where the error indicated by the control error information is not within the predetermined range, re-execute the first operation using the phase shift amount value as an initial value.

According to the above aspect, at the time of changing the frequency in the second operation, the control circuitry may change the phase shift amount to a value determined based on the phase shift amounts from at least the previous time and two times back, and re-acquire the control error information, and in a case where the error indicated by the control error information is not within the predetermined range, re-execute the first operation using the phase shift amount value after changing as an initial value.

According to the above aspect, the control circuitry may change the output time ratio of the voltage output from the oscillator by controlling the pulse output circuit so as to change the duty cycle of the pulses input to the switching devices.

According to the above aspect, the adjusting circuit may further include a DC/DC converter that changes the magnitude of DC voltage input to the oscillator, and the control circuitry may change the amplitude of the voltage output from the oscillator by changing the voltage output from the DC/DC converter.

The above aspect may be realized as a power transmission device of a wireless power transmission system.

The above aspect may be realized as a computer program executed by a computer installed in a power transmission device of a wireless power transmission system.

INDUSTRIAL APPLICABILITY

The technology according to the present disclosure is applicable to electricity charging/supply systems which perform electricity charging/supply of electronic devices such as smartphones, tablet terminals, laptop computers, and so forth, and electric machines such as electric vehicles and so forth.

What is claimed is:

1. A power transmission device comprising:
an oscillator including four switching devices, which are a first switching device and a third switching device connected to a high-potential side of DC power supplied from a DC source and a second switching device and a fourth switching device connected to a low-potential side of the DC power, a first output end of the oscillator connected to a side of the first switching device opposite to the high-potential side being connected to a side of the second switching device opposite to the low-potential side, a second output end of the oscillator connected to a side of the third switching device opposite to the high-potential side being connected to a side of the fourth switching device opposite to the low-potential side, the oscillator converting the DC power into AC power by pulses supplied to each of the first through fourth switching devices via the first and second output terminals, and outputting the AC power;
a power transmission antenna that transmits the AC power output from the oscillator to output to a load of a power receiving device;
a memory that holds a predetermined required voltage of the power receiving device;
a receiving circuit that receives a voltage supplied to the load of the power receiving device; and
control circuitry that causes the oscillator to change a voltage of the AC power by changing a phase shift value between a pulse supplied to the first switching device and a pulse supplied to the second switching device,
wherein the control circuitry performs operations comprising:
causing the power transmission antenna to transmit the AC power of the oscillator set to an initial transmission frequency and an initial phase shift value;
causing the receiving circuit to receive a first voltage of the AC power received by the power receiving device;
changing the initial phase shift value to a first phase shift value such that a difference between the predetermined required voltage and the first voltage converges within a predetermined range;
determining a first transmission efficiency of the AC power at the initial transmission frequency and the first phase shift value;
causing the power transmission antenna to transmit the AC power of the oscillator set to the initial transmission frequency and the first phase shift value;

causing the receiving circuit to receive a second voltage of the AC power received by the power receiving device;

changing the first phase shift value to a second phase shift value such that a difference between the predetermined required voltage and the second voltage converges within the predetermined range;

determining a second transmission efficiency of the AC power at a first transmission frequency and at the second phase shift value;

changing the first transmission frequency and the second phase shift value until the second transmission efficiency becomes lower than the first transmission efficiency;

determining that the second transmission efficiency is the maximum when the second transmission efficiency becomes lower than the first transmission efficiency; and causing the power transmission antenna to transmit the AC power of the oscillator set to the first transmission frequency and the second phase shift value.

2. The power transmission device according to claim 1, wherein the control circuitry supplies, to the second switching device, an inverted pulse of a pulse supplied to the first switching device after a period in which both the first switching device and the second switching device are off, and the control circuitry supplies, to the third switching device, an inverted pulse of a pulse supplied to the fourth switching device after a period in which both the third switching device and the fourth switching device are off.

3. The power transmission device according to claim 1, wherein, during a period where a phase difference Δθ between the pulse supplied to the first switching device and the pulse supplied to the second switching device is occurring, the control circuitry instructs one of turning both the first switching device and the third switching device on at the same time, and turning both the second switching device and the fourth switching device on at the same time, using the oscillator.

4. The power transmission device according to claim 1, wherein the control circuitry changes a frequency of the AC power output from the oscillator from high-frequency to low-frequency, and determines a frequency of the AC power where a transmission efficiency of the AC power is greatest.

5. The power transmission device according to claim 1, wherein the receiving circuit receives, from the power receiving device, error information indicating an error between the voltage supplied to the load and the predetermined required voltage, and wherein the control circuitry uses the error which the error information indicates to converge the received voltage to the range of the predetermined value.

6. A wireless power transmission system comprising:
a power transmission device; and
a power receiving device,
wherein the power transmission device comprises:
an oscillator including four switching devices, which are a first switching device and a third switching device connected to a high-potential side of DC power supplied from a DC source and a second switching device and a fourth switching device connected to a low-potential side of the DC power, a first output end of the oscillator connected to a side of the first switching device opposite to the high-potential side being connected to a side of the second switching device opposite to the low-potential side, a second output end of the oscillator connected to a side of the third switching device opposite to the high-potential side being connected to a side of the fourth switching device opposite to the low-potential side, the oscillator converting the DC power into AC power by pulses supplied to each of the first through fourth switching devices via the first and second output terminals, and outputting the AC power, a power transmission antenna that transmits the AC power output from the oscillator to output to a load of the power receiving device, a memory that holds a predetermined required voltage of the power receiving device, a receiving circuit that receives a voltage supplied to the load of the power receiving device, and control circuitry that causes the oscillator to change a voltage of the AC power by changing a phase shift value between a pulse supplied to the first switching device and a pulse supplied to the second switching device, wherein the control circuitry performs operations comprising:

causing the power transmission antenna to transmit the AC power of the oscillator set to an initial transmission frequency and an initial phase shift value;

causing the receiving circuit to receive a first voltage of the AC power received by the power receiving device;

changing the initial phase shift value to a first phase shift value such that a difference between the predetermined required voltage and the first voltage converges within a predetermined range;

determining a first transmission efficiency of the AC power at the initial transmission frequency and the first phase shift value;

causing the power transmission antenna to transmit the AC power of the oscillator set to the initial transmission frequency and the first phase shift value;

causing the receiving circuit to receive a second voltage of the AC power received by the power receiving device;

changing the first phase shift value to a second phase shift value such that a difference between the predetermined required voltage and the second voltage converges within the predetermined range;

determining a second transmission efficiency of the AC power at a first transmission frequency and at the second phase shift value;

changing the first transmission frequency and the second phase shift value until the second transmission efficiency becomes lower than the first transmission efficiency;

determining that the second transmission efficiency is the maximum when the second transmission efficiency becomes lower than the first transmission efficiency; and causing the power transmission antenna to transmit the AC power of the oscillator set to the first transmission frequency and the second phase shift value.

* * * * *